(12) United States Patent
Haseyama

(10) Patent No.: US 8,180,161 B2
(45) Date of Patent: May 15, 2012

(54) IMAGE CLASSIFICATION DEVICE AND IMAGE CLASSIFICATION PROGRAM

(75) Inventor: Miki Haseyama, Sapporo (JP)

(73) Assignee: National University Corporation Hokkaido University, Sapporo-Shi (JP)

( * ) Notice: Subject to any disclaimer, the term of this patent is extended or adjusted under 35 U.S.C. 154(b) by 215 days.

(21) Appl. No.: 12/673,423

(22) PCT Filed: Dec. 1, 2008

(86) PCT No.: PCT/JP2008/071803
§ 371 (c)(1),
(2), (4) Date: Feb. 12, 2010

(87) PCT Pub. No.: WO2009/072466
PCT Pub. Date: Jun. 11, 2009

(65) Prior Publication Data
US 2011/0103700 A1    May 5, 2011

(30) Foreign Application Priority Data

Dec. 3, 2007   (JP) ................................. 2007-312371

(51) Int. Cl.
*G06K 9/62*    (2006.01)

(52) U.S. Cl. .......................... 382/224; 382/225; 382/305

(58) Field of Classification Search .................. 382/224, 382/231, 128, 133, 159, 161, 165, 170; 707/722, 707/757
See application file for complete search history.

(56) References Cited

U.S. PATENT DOCUMENTS

| | | |
|---|---|---|
| 2006/0110036 A1 | 5/2006 | Luo et al. |
| 2009/0150376 A1 | 6/2009 | O'Callaghan et al. |
| 2010/0220978 A1 | 9/2010 | Ogikubo |

FOREIGN PATENT DOCUMENTS

| | | |
|---|---|---|
| EP | 1 755 067 A1 | 2/2007 |
| JP | 2000-148795 A | 5/2000 |

(Continued)

OTHER PUBLICATIONS

Takashi Watanabe et al., "A Study on Accurate Image Clustering Using Color Edges(Edge o Koryo shita Ruiji Gazo Bunrui no Koseidoka ni Kansuru Kosatsu)", ITE Technical Report, Feb. 22, 2007, vol. 31, No. 10, p. 7 to 10, English abstract on p. 7.

(Continued)

*Primary Examiner* — Brian Q Le
*Assistant Examiner* — Edward Park
(74) *Attorney, Agent, or Firm* — Marvin A. Motsenbocker; Motts Law, PLLC

(57) ABSTRACT

An image classification device includes a characteristic value set calculation unit 11 that calculates a characteristic value set of the whole image for each of multiple sets of image data in an image database 51, detects an edge of the set of the image data, and calculates a characteristic value set of the detected edge portions; a first clustering unit 12 that classifies the multiple sets of image data into multiple clusters on the basis of the characteristic value sets of the whole images; a second clustering unit 13 that further classifies the multiple clusters classified by the first clustering unit 12 into multiple clusters on the basis of the characteristic value sets of the edge portions; and a cluster integration unit 14 that determines which pixels constitutes a subject in each of the multiple sets of image data, based on the composition of the image, and integrates some of the multiple clusters classified by the second clustering unit 13 together based on the pixels constituting the subject.

2 Claims, 21 Drawing Sheets

FOREIGN PATENT DOCUMENTS

| | | |
|---|---|---|
| JP | 2006-344155 A | 12/2006 |
| WO | 2007/126097 A1 | 11/2007 |

OTHER PUBLICATIONS

Seiji Hotta et al., "Approximate kNN Search of Images Based on Dimensionality Reduction and Clustering (Jigen Asshuku to Clustering ni Motozuku Gazo no Kinji kNN Kensaku)", The Journal of the Institute of Image Information and Television Engineers Dec. 1, 2001, vol. 55, No. 12, pp. 119 to 122. English abstract on p. 119.

Michael J. Swain et al., "Color indexing", International Journal of Computer Vision 7(1): 11-32 (1991).

Ryota Tokumoto et al., "Color-distribution based similar image clustering and its performance evaluation", International Conference on Kansei Engineering and Emotion Research 2007 (KEER2007), vol. C-25(2007).

Toshiaki Nakagawa et al.,"An Image Retrieval Method Using Local Pattern Matching", Institute of Electronics, Information and communication Engineers, D-II, vol. J85-D-II, No. 1, pp. 149-152, Jan. 2002, and English translation of Abstract and Conclusion.

C L Bird et al.;"Image Clustering Using Content-Based Techniques";IEE;Conference Publication No. 443;pp. 385-389(Jul. 1997) (Cited in the extended European search report in the counterpart European patent application).

Xiaofei He et al.;"Imagerank:Spectral Techniques for Structural Analysis of Image Database"; IEEE;ICME 2003;pp. 25-28(2003) (Cited in the extended European search report in the counterpart European patent application).

IMAGE CLASSIFICATION DEVICE AND IMAGE CLASSIFICATION PROGRAM

TECHNICAL FIELD

The present invention relates to an image classification device and an image classification program for classifying multiples sets of image data.

BACKGROUND ART

The number of digital images held by a user has been rapidly increasing with the recent widespread use of digital cameras and image scanners and the increase in capacity of recording media. In such a situation, there is an increasing need for an image search technique which allows a user to effectively view a desired image in a large amount of accumulated image groups. One of typical search methods is a method based on a similarity between a search request image (query image) held by the user and each of images in a database (see, for example, Non-patent Document 1 and Non-patent Document 2). By use of these methods, the user can acquire a desired image from the database.

Moreover, as a method for searching for an image similar to the query image, there is an image search device for calculating an inter-image distance between a query image and each set of other image data and then extracting as similar images the sets of image data in ascending order of the inter-image distance (see, for example, Patent Document 1). In Patent Document 1, a user can search for a desired image by drawing the query image even if not having the query image.
Patent Document 1: Japanese Patent Application Publication No. 2000-148795
Non-patent Document 1: M. J. Swain and D. H. Ballard, "Color indexing", Int. J. Comput. Vision, vol. 7, no. 1, pp. 11-32, 1991.
Non-patent Document 2: Toshiaki Nakagawa, Takeshi Hara and Hiroshi Fujita, "An Image Retrieval Method Using Local Pattern Matching", the transactions of the Institute of Electronics, Information and Communication Engineers (D-II), vol. J85-D-II, no. 1, pp. 149-152, January 2002.

DISCLOSURE OF INVENTION

However, the methods described above are based on the assumption that a user has a query image. Therefore, when the user does not have a query image or is uncertain about the search request, the user faces difficulty in searching. In Patent Document 1, the user draws the query image. Therefore, the user faces difficulty in searching for a desired image when the user cannot draw a query image well. Moreover, when the user does not have a clear image about a desired image, the method described in Patent Document 1 cannot be applied.

In such a case, all the images in the database have been presented to the user by using thumbnail display to assist the user to perform an image search operation. However, with the recent increase in scale of the database, all the images in the database can no longer be displayed in one screen. As a result, the thumbnail display has a difficulty in assisting the image search.

Therefore, there is needed a technique of automatically classifying images in a database and effectively presenting a classification result to a user. Specifically, the technique allows a user to intuitively recognize images in a database by previously classifying the images in the database into groups of similar images and presenting a result of the classification. Such a technique is expected for allowing a user to efficiently search for images even when the user does not have a query image or a clear search intention.

Therefore, it is an object of the present invention to provide an image classification device and an image classification program for classifying multiple sets of image data into groups of similar images.

In order to solve the above problem, the first aspect of the present invention relates to an image classification device for classifying sets of image data into groups of similar images. Specifically, the image classification device according to the first aspect of the present invention includes: an image database for storage of sets of image data; a characteristic value set calculation unit that calculates a characteristic value set of the whole image of the set of image data, detects an edge of the corresponding set of image data, and calculates a characteristic value set of the detected edge portion, for each of the sets of image data; a first clustering unit that classifies the sets of image data into clusters based on the characteristic value sets of the whole images; a second clustering unit that further classifies the clusters classified by the first clustering unit into clusters based on the characteristic value sets of the edge portions; and a cluster integration unit that determines which pixels constitutes a subject in each of the sets of image data, based on a composition of the corresponding image, and integrates some of the clusters classified by the second clustering unit together based on the pixels constituting the subject.

The image classification device according to the first aspect as described above can achieve highly accurate image classification by performing multistage processing by focusing on colors in the image and a distribution thereof. Specifically, after clustering is performed by the first clustering unit based on the characteristic value set of the whole image, clustering is performed by the second clustering unit by focusing on an edge, which is an important feature of the image, to increase the accuracy. Furthermore, in order to suppress an influence of the excessive division, the clusters are integrated based on the characteristic value set obtained from the subject in the image data. In the image classification device according to the first aspect of the present invention, first, sets of the image data are roughly classified based on the characteristic value set of the whole image. Next, more detailed hierarchical classification is performed by focusing on the edge portions which characterize the images. Thereafter, the clusters excessively divided by the classifications are integrated for each of the subjects based on the features of the subject. Lastly, by integrating the clusters based on the subject, a cluster which is likely to match to a search keyword entered by the user can be generated.

Here, a display unit may be provided which arbitrarily arranges thumbnails of the sets of image data, update and display coordinates of each of the thumbnails based on the characteristic value set of the whole image of the image data, the characteristic value set of the edge portion of the image data, the characteristic value set of the pixels constituting the subject of the image data, and the clusters of the image data determined by the cluster integration unit 14, calculate a shift amount of each of the thumbnails, and repeat the processing of updating and displaying the coordinates until the shift amount of each of the thumbnails is converged to 0.

The image classification device as described above allows the user to intuitively recognize the image data in the image database. Thus, even when the user does not have the query image or a clear search intention, desired image data can be searched for.

Here, for each of the sets of image data, the characteristic value set calculation unit calculates a color correlogram of the whole image based on a luminance value of the image data, calculates a distance of the color correlogram from the whole image of each of the other sets of image data as a characteristic value set of the whole image, calculates a color correlogram in the edge portion, and calculates a distance of the color correlogram from the edge portion of each of the other sets of image data as a characteristic value set of the edge portion.

Thus, the characteristic value sets of the image data can be calculated by taking into consideration not only an amount of colors in the image data but also a spatial distribution.

Moreover, based on the characteristic value sets of the whole images, the first clustering unit determines the number of clusters and determines which sets of image data to belong to each of the clusters so that a clustering error for each of all the clusters falls within a threshold. Based on the characteristic value sets of the edge portions, the second clustering unit determines the number of clusters and determines which sets of image data to belong to each of the clusters so that an in-cluster error of each of the clusters classified by the first clustering unit falls within a threshold.

Thus, high-accuracy clustering can be executed by performing multiple stages of clustering.

The cluster integration unit provides an arbitrary boundary line in the image data, calculates a distance between color histograms in first and second regions obtained by the boundary line, shifts the boundary line to obtain, as a boundary line for defining the composition, a boundary line across which the distance between color histograms significantly changes and sets, as the pixels constituting the subject, pixels whose color differences from a representative color of pixels constituting outside the boundary line are greater than a threshold. Here, the cluster integration unit further calculates a color correlogram and a color histogram of the pixels constituting the subject, and iteratively integrates the clusters classified by the second clustering unit together based on the calculated color correlogram and color histogram, until a dissimilarity between any two clusters of the clusters becomes higher than a threshold.

Thus, by integrating the clusters having similar characteristic value sets in the subject, the excessive division can be suppressed and user friendly image classification can be achieved.

A query image characteristic value set calculation unit and a cluster determination unit may be provided, the query image characteristic value set calculation unit calculating a feature vector of query image data, the cluster determination unit determining, based on the feature vector of the query image data, which cluster the query image data belongs to among clusters generated by the cluster integration unit.

The image classification device as described above makes it possible to extract similar images from the multiple sets of image data.

Specifically, the feature vector has, as parameters, a color correlogram of the whole image, a color correlogram of an edge portion, and a color histogram and a color correlogram in a subject region. Here, the query image characteristic value set calculation unit calculates the feature vector of the query image data by calculating the color correlogram of the whole image of the query image data, the color correlogram of the edge portion of the query image data, and the color histogram and the color correlogram in the subject region of the query image data. Moreover, the cluster determination unit calculates an average of the feature vectors of the sets of image data belonging to each of the clusters generated by the cluster integration unit and sets a cluster that has a feature vector with the smallest distance from the feature vector of the query image data as a cluster to which the query image belongs.

The second aspect of the present invention relates to an image classification program for classifying sets of image data into groups of similar images. Specifically, the image classification program according to the second aspect of the present invention allows a computer to function as: characteristic value set calculation means for calculating a characteristic value set of the whole image of set of image data stored in an image database, detecting an edge of the corresponding set of the image data, and calculating characteristic value sets of the detected edge portion, for each of the sets of image data; first clustering means for classifying the sets of sets of image data into clusters based on the characteristic value sets of the whole images; second clustering means for further classifying the clusters classified by the first clustering means into clusters based on the characteristic value sets of the edge portions; and cluster integration means for determining which pixels constitutes a subject in each of the sets of image data, based on a composition of the image, and integrates some of the clusters classified by the second clustering means together based on the pixels constituting the subject.

Here, the computer may be further allowed to function as: display means for arbitrarily arranging thumbnails of the sets of image data, updating and displaying coordinates of each of the thumbnails based on the characteristic value set of the whole image of the image data, the characteristic value set of the edge portion of the image data, the characteristic value set of the pixels constituting the subject of the image data, calculating a shift amount of each of the thumbnails, and repeating the processing of updating and displaying the coordinates until the shift amount of each of the thumbnails is converged to 0.

For each of the sets of image data, the characteristic value set calculation means may calculate a color correlogram of the whole image based on a luminance value of the image data, calculate a distance between the color correlograms with the whole image of another set of image data as a characteristic value set of the whole image, calculate a color correlogram in the edge portion, and calculate a distance between the color correlograms with the edge portion of another set of image data as a characteristic value set of the edge portion. Here, the description is given of the case where the characteristic value sets are calculated based on the color correlogram. However, the characteristic value sets may be calculated by use of the color correlogram and the color histogram.

Based on the characteristic value sets of the whole images, the first clustering means may determine the number of clusters and determine which sets of image data to belong to each of the clusters so that a clustering error for each of all the clusters falls within a threshold. Based on the characteristic value sets of the edge portions, the second clustering means may determine the number of clusters and determine which sets of image data to belong to each of the clusters so that an in-cluster error of each of the clusters classified by the first clustering unit falls within a threshold.

The cluster integration means may provide an arbitrary boundary line in the image data, calculate a distance between color histograms in first and second regions obtained by the boundary line, shift the boundary line to obtain, as a boundary line for defining the composition, a boundary line across which the distance between color histograms significantly changes and set, as the pixels constituting the subject, pixels whose color differences from a representative color of pixels constituting outside the boundary line are greater than a threshold. Here, the cluster integration means may further calculate a color correlogram and a color histogram of the pixels constituting the subject, and iteratively integrate the clusters classified by the second clustering means, based on the calculated color correlogram and color histogram, until a dissimilarity between any two clusters of the clusters is set higher than a threshold.

Moreover, the computer may be further allowed to function as: query image characteristic value set calculation means for calculating a feature vector of query image data; and cluster determination means for determining, based on the feature vector of the query image data, which cluster the query image data belongs to among clusters generated by the cluster integration means.

Here, the feature vector may have, as parameters, a color correlogram of the whole image, a color correlogram of an edge portion, and a color histogram and a color correlogram in a subject region. The query image characteristic value set calculation means may calculate the feature vector of the query image data by calculating the color correlogram of the whole image of the query image data, the color correlogram of the edge portion of the query image data, and the color histogram and the color correlogram in the subject region of the query image data.

The cluster determination means may calculate an average of the feature vectors of the sets of image data belonging to each of the clusters generated by the cluster integration means and set a cluster that has a feature vector with the smallest distance from the feature vector of the query image data as a cluster to which the query image belongs.

According to the present invention, it is possible to provide an image classification device and an image classification program for classifying multiple sets of image data into groups of similar images.

BEST MODE FOR CARRYING OUT THE INVENTION

Figure 1:
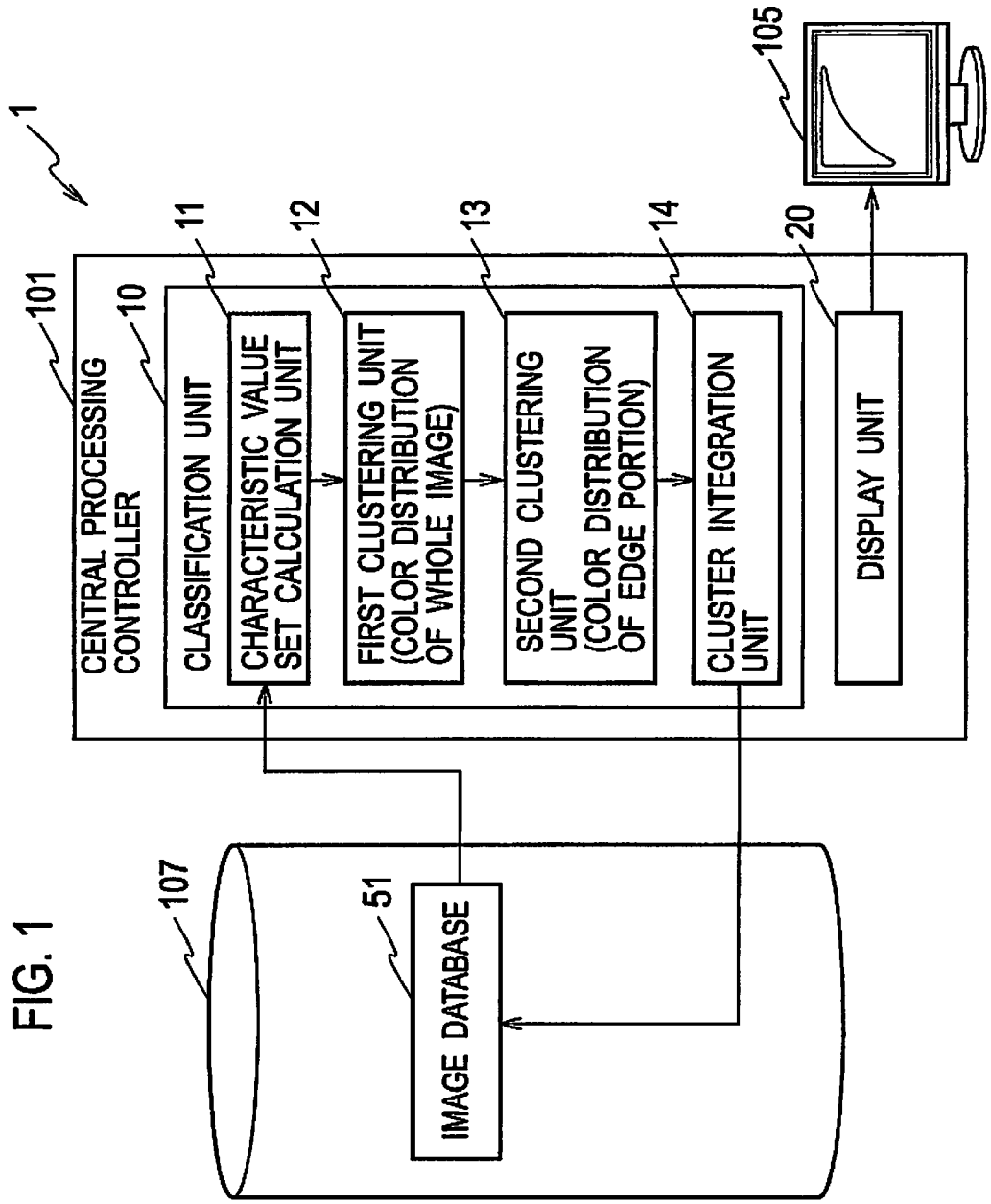
FIG. 1 is a functional block diagram of an image classification device according to a preferred embodiment of the present invention.

Next, with reference to the drawings, embodiments of the present invention will be described. In the following description of the drawings, the same or similar parts will be denoted by the same or similar reference numerals.

Preferred Embodiment

An image classification device 1 according to a preferred embodiment of the present invention classifies multiple sets of image data into groups of similar images. The image classification device 1 according to the preferred embodiment of the present invention classifies image data in an image database 51 into groups of similar images and searches for an image based on the obtained classification result. Furthermore, the image classification device 1 visualizes and presents the classification and search result on a three-dimensional space. By arranging the classification and search result on the three-dimensional space, the image classification device 1 can achieve a user interface which can enhance the understanding of a similarity between images based on a spatial distance.

(Overview of Image Classification Device)

Figure 2:
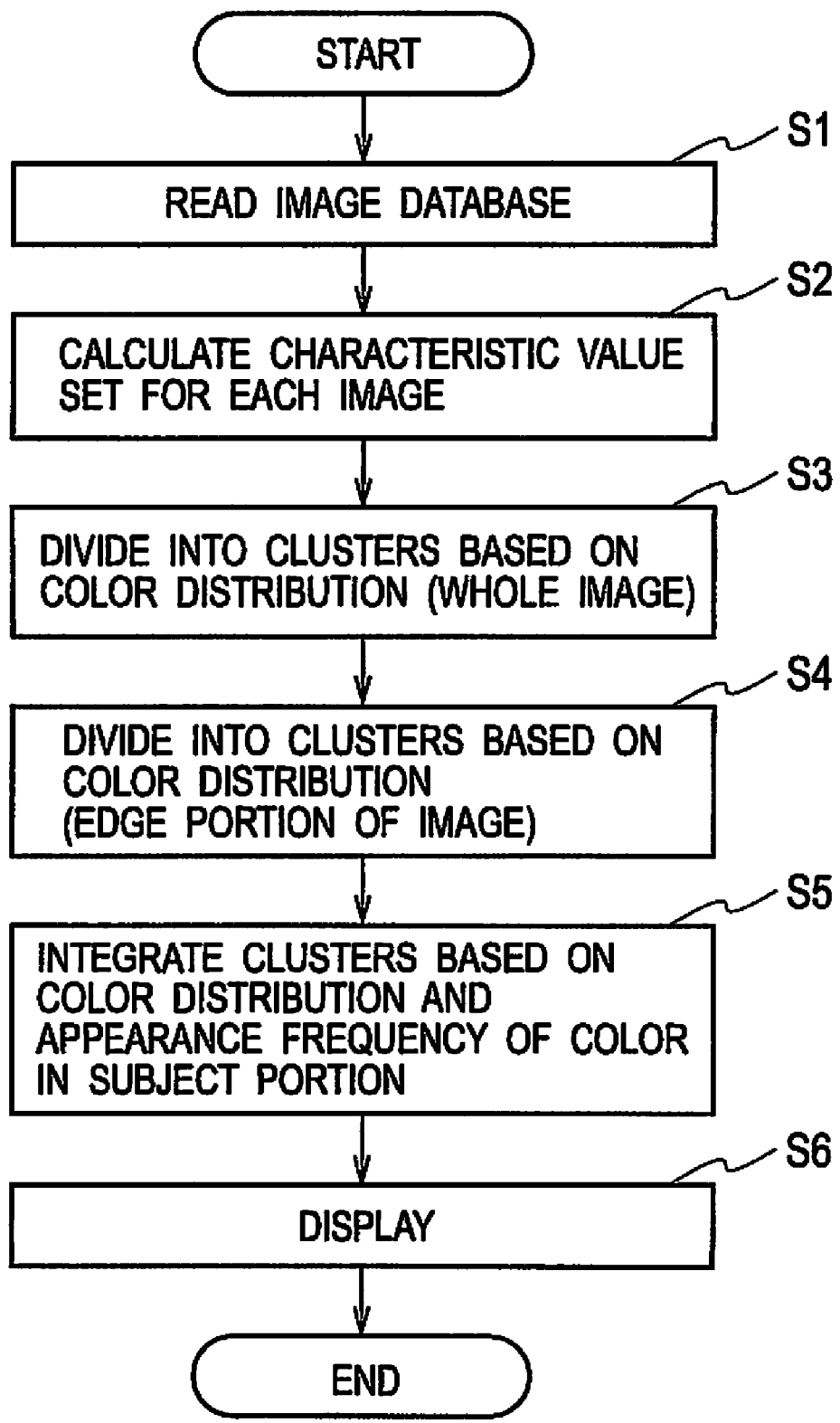
FIG. 2 is a diagram showing an outline of an image classification method according to the preferred embodiment of the present invention.

With reference to FIG. 2, a description will be given of an outline of processing by the image classification device 1 according to the preferred embodiment of the present invention.

First, in Step S1, image data in the image database 51 is read from a storage device 107. Next, in Step S2, corresponding characteristic value sets are calculated for respective sets of the image data in the image database thus read in Step S1. This characteristic value set includes a characteristic value set calculated from pixels of the whole image and a characteristic value set calculated from pixels in an edge portion of the image.

Next, in Step S3 to Step S5, the image classification device 1 performs clustering in multiple stages based on the extracted characteristic value sets. In this event, the image classification device 1 classifies images based on colors, structures and the like. Specifically, in Step S3, the image classification device 1 divides multiple sets of image data into multiple clusters based on a characteristic value set related to a color distribution of the whole image. Thereafter, in Step S4, the image classification device 1 further divides the clusters classified in Step S3, based on a characteristic value set related to a color distribution in the edge portion of the image. In Step S5, the image classification device 1 integrates the clusters excessively divided in Step S4, based on a color distribution of a subject portion and an appearance frequency of colors.

In Step S6, the image classification device 1 displays a result of the classification of the images in the image database 51 on a display device 105. In this event, the image classification device 1 visualizes the classification result on a three-dimensional space by using the corresponding characteristic value set of respective image sets and the clustering result obtained by the processing of Step S3 to Step S5.

A classification unit 10 in the image classification device 1 according to the preferred embodiment of the present invention performs clustering by focusing on a color distribution in the image and by use of a color correlogram and a K-means method (Step S3). Based on the classification result thus obtained, the image classification device 1 divides each of the clusters by use of a color correlogram calculated for edge pixels, in order to take into consideration a more detailed color distribution in the image (Step S4). Here, the edge pixels are edges acquired by use of a Sobel filter, and are not necessarily edges of the subject. In this event, in order to suppress influences of excessive division, the image classification device 1 applies reintegration processing on the clusters by use of the color histogram and color correlogram obtained from the subject (Step S5). In calculation of a distance between the characteristic value sets in each of the processing steps described above, a quadratic form distance between the color correlograms is used. By use of the characteristic value set of each image and belonging cluster information thus obtained, the image classification device 1 allows a display unit 20 to visualize the classification result on the three-dimensional space (Step S6).

Here, the description was given of the case where the processing is performed by use of only the color correlogram in Step S3 and Step S4. However, only the color histogram may be used or both of the color correlogram and color histogram may be used.

(Hardware Configuration of Image Classification Device)

Figure 3:
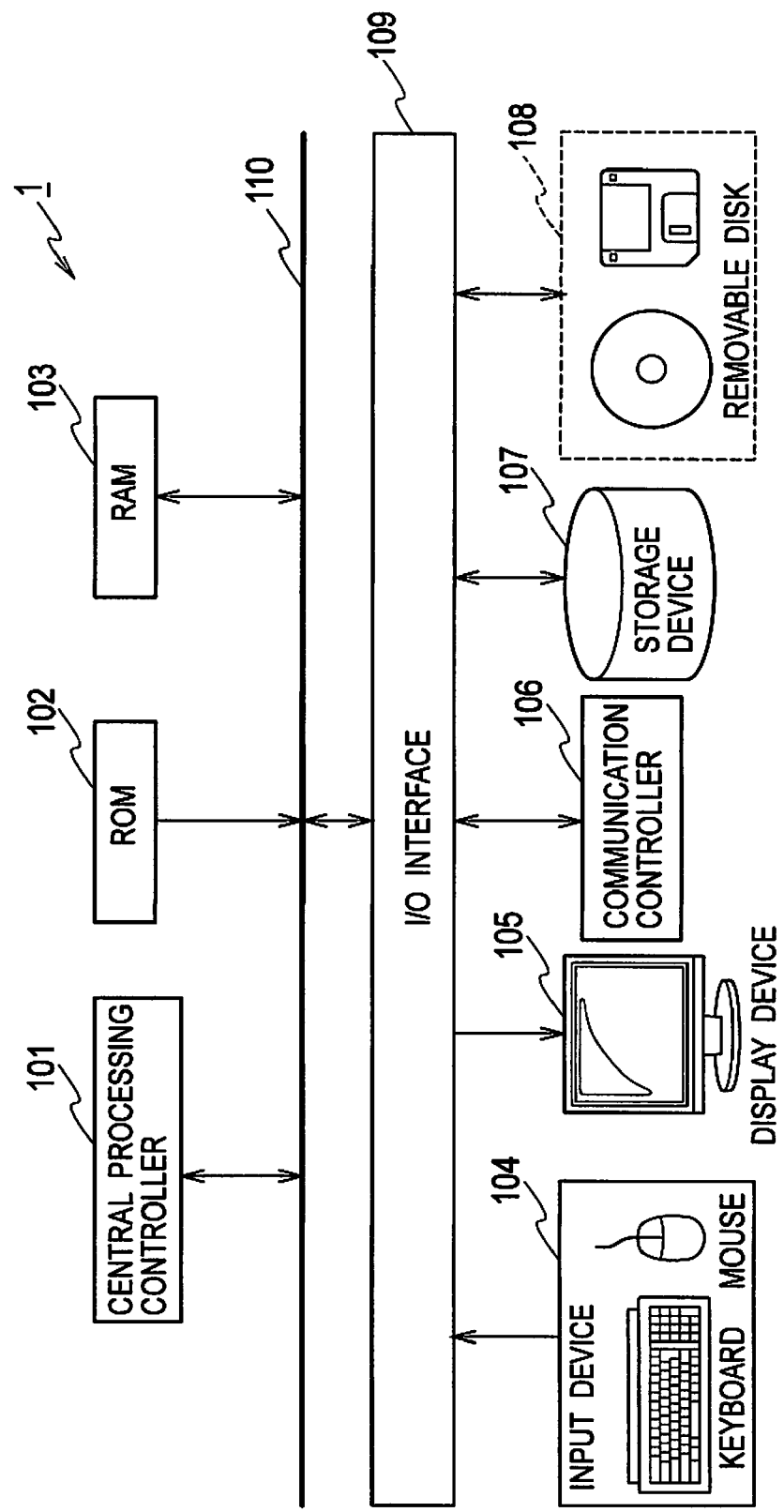
FIG. 3 is a hardware configuration diagram of the image classification device according to the preferred embodiment of the present invention.

As shown in FIG. 3, the image classification device 1 according to the preferred embodiment of the present invention includes a central processing controller 101, a ROM (Read Only Memory) 102, a RAM (Random Access Memory) 103, and an I/O interface 109, which are connected to each other through a bus 110. An input device 104, a display device 105, a communication controller 106, a storage device 107, and a removable disk 108 are connected to the I/O interface 109.

The central processing controller 101 reads a boot program for starting the image classification device 1 from the ROM 102 based on an input signal from the input device 104 and executes the boot program. The central processing controller 101 further reads an operating system stored in the storage device 107. Furthermore, the central processing controller 101 controls the various devices based on input signals from the input device 104, the communication controller 106 and the like, reads programs and data stored in the RAM 103, the storage device 107 and the like, and loads the programs and data into the RAM 103. Furthermore the central processing controller 101 is a processor which achieves a series of processing to be described later, including processing to perform calculation and processing of data based on a command of the program thus read from the RAM 103.

The input device 104 includes input devices, such as a keyboard and a mouse, which are used by an operator to input various operations. The input device 104 creates an input signal based on the operation by the operator and transmits the signal to the central processing controller 101 through the I/O interface 109 and the bus 110. A CRT (Cathode Ray Tube) display, a liquid crystal display or the like is employed for the display device 105. The display device 105 receives an output signal to be displayed on the display device 105 from the central processing controller 101 through the bus 110 and the I/O interface 109 and displays a result of processing by the central processing controller 101, and the like, for example.

The communication controller 106 is a device such as a LAN card and a modem. The communication controller 106 is a device which connects the image classification device 1 to the Internet or a communication network such as a LAN. The data sets transmitted to or received from the communication network through the communication controller 106 are transmitted to and received from the central processing controller 101 as input signals or output signals through the I/O interface 109 and the bus 110.

The storage device 107 is a semiconductor storage device or a magnetic disk device. The storage device 107 stores data and programs to be executed by the central processing controller 101. The removable disk 108 is an optical disk or a flexible disk, and signals read or written by a disk drive are transmitted to and received from the central processing controller 101 through the I/O interface 109 and the bus 110.

In the storage device 107 of the image classification device 1 according to the preferred embodiment of the present invention, an image classification program is stored, and an image database 51 is also stored as shown in FIG. 1. Moreover, when the central processing controller 101 of the image classification device 1 reads and executes the image classification program, a classification unit 10 and a display unit 20 are implemented in the image classification device 1.

(Functional Blocks of Image Classification Device)

As shown in FIG. 1, the image classification device 1 according to the preferred embodiment of the present invention includes the image database 51, the classification unit 10 and the display unit 20. The classification unit 10 includes a characteristic value set calculation unit 11, a first clustering unit 12, a second clustering unit 13, and a cluster integration unit 14.

The image database 51 stores multiple sets of image. The image data stored in the image database is to be classified by the image classification device 1 according to the preferred embodiment of the present invention. In the image database 51, each set of the image data may have its characteristic value sets, cluster information, and the like associated with each other, the characteristic value sets calculated by processing to be described later, the cluster information including cluster identifiers.

The characteristic value set calculation unit 11 calculates a characteristic value set of the whole image for each of the sets of image data stored in the image database 51. Moreover, the characteristic value set calculation unit 11 detects edges of the corresponding sets of the image data and calculates characteristic value sets of the detected edge portions. Here, the characteristic value set calculation unit 11 calculates a color correlogram based on a luminance value of the image data for each of the multiple sets of image data. The characteristic value set calculation unit 11 calculates a distance of the color correlogram from another set of image data as a characteristic value set. The characteristic value set calculated from the pixels of the whole image may be calculated by adding characteristic value sets calculated from the pixels of the edge portions in the image and characteristic value sets calculated from the pixels of the edge portions and exclusive pixels among the pixels of the whole image.

Here, the description is given of the case where the characteristic value set calculation unit 11 of the present invention performs the calculation based on the color correlogram for each set of the image data. However, only the color histogram may be used or both of the color histogram and color correlogram may be used.

The first clustering unit 12 classifies the multiple sets of image data into clusters based on the characteristic value set of the whole image. Based on the characteristic value set of the whole image, the first clustering unit 12 determines the number of clusters and sets of image data belonging to each of the clusters so as to set a clustering error for all the clusters to be within a threshold.

The second clustering unit 13 further classifies each of the clusters classified by the first clustering unit 12 into clusters based on the characteristic value sets of the edge portions. Based on the characteristic value sets of the edge portions, the second clustering unit 13 determines the number of clusters and sets of image data belonging to each of the clusters so as to set an in-cluster error of each of the clusters classified by the first clustering unit 12 to be within a threshold.

The cluster integration unit 14 determines pixels constituting a subject from the composition of the image for each of the sets of image data and integrates the multiple clusters classified by the second clustering unit 13 based on the pixels constituting the subject. The cluster integration unit 14 provides an arbitrary boundary line in a set of the image data and calculates a distance between color histograms in a first region and a second region obtained by the boundary line. The cluster integration unit 14 determines, by shifting the boundary line, a boundary line which significantly changes the distance between the color histograms as the boundary line for determining the composition. Here, the cluster integration unit 14 determines pixels whose color difference from a representative color of pixels constituting outside the boundary line is greater than a threshold as the pixels constituting the subject. The cluster integration unit 14 further calculates a color correlogram and a color histogram of the pixels constituting the subject. Based on the calculated color correlogram and color histogram, the cluster integration unit 14 iteratively integrates clusters of the multiple clusters classified by the second clustering unit 13 until a dissimilarity between any two clusters becomes higher than a threshold.

The display unit 20 visually displays the image data classified by the classification unit 10 on the display device 105. The display unit 20 arbitrarily arranges thumbnails corresponding to the sets of image data. Furthermore, based on the characteristic value set of the whole image, the characteristic value sets of the edge portions, the characteristic value set of the pixels constituting the subject, and the cluster of the image data determined by the cluster integration unit 14, the display unit 20 updates and displays coordinates of each of the thumbnails and calculates a shift amount of each of the thumbnails. The display unit 20 repeats the processing of updating and displaying the coordinates until the shift amount of each thumbnail is converged to 0. The display unit 20 defines a distance between the sets of image data from the color correlogram of the whole image, the color correlogram of the edge portions, and the color correlogram in the subject region. Based on the distance between the sets of image data, the display unit 20 displays the thumbnails on the display device 105 while moving the thumbnails. In the preferred embodiment of the present invention, the description is given of the case where the distance between the sets of image data is calculated based on the color correlograms. However, only the color histograms may be used or both of the color histograms and color correlograms may be used.

(Characteristic Value Set Calculation Unit)

The image classification device 1 according to the preferred embodiment of the present invention targets color images for classification and automatically classifies the images by use of features based on colors in the images. Generally, a color histogram is used as the feature expressing the colors in the image. However, the use of the color histogram can not take into consideration a spatial distribution of the colors in the image. Therefore, the image classification device 1 according to the preferred embodiment of the present invention focuses on a color correlogram as a feature with which the color distribution in the image can be considered. By using the color correlogram instead of the color histogram, a difference in the spatial color distribution is taken into consideration and thus high-accuracy automatic image classification is achieved. In the preferred embodiment of the present invention, the description is given of the case where the classification is performed based on the color correlograms. However, only the color histograms may be used or both of the color histograms and color correlograms may be used.

Figure 4:
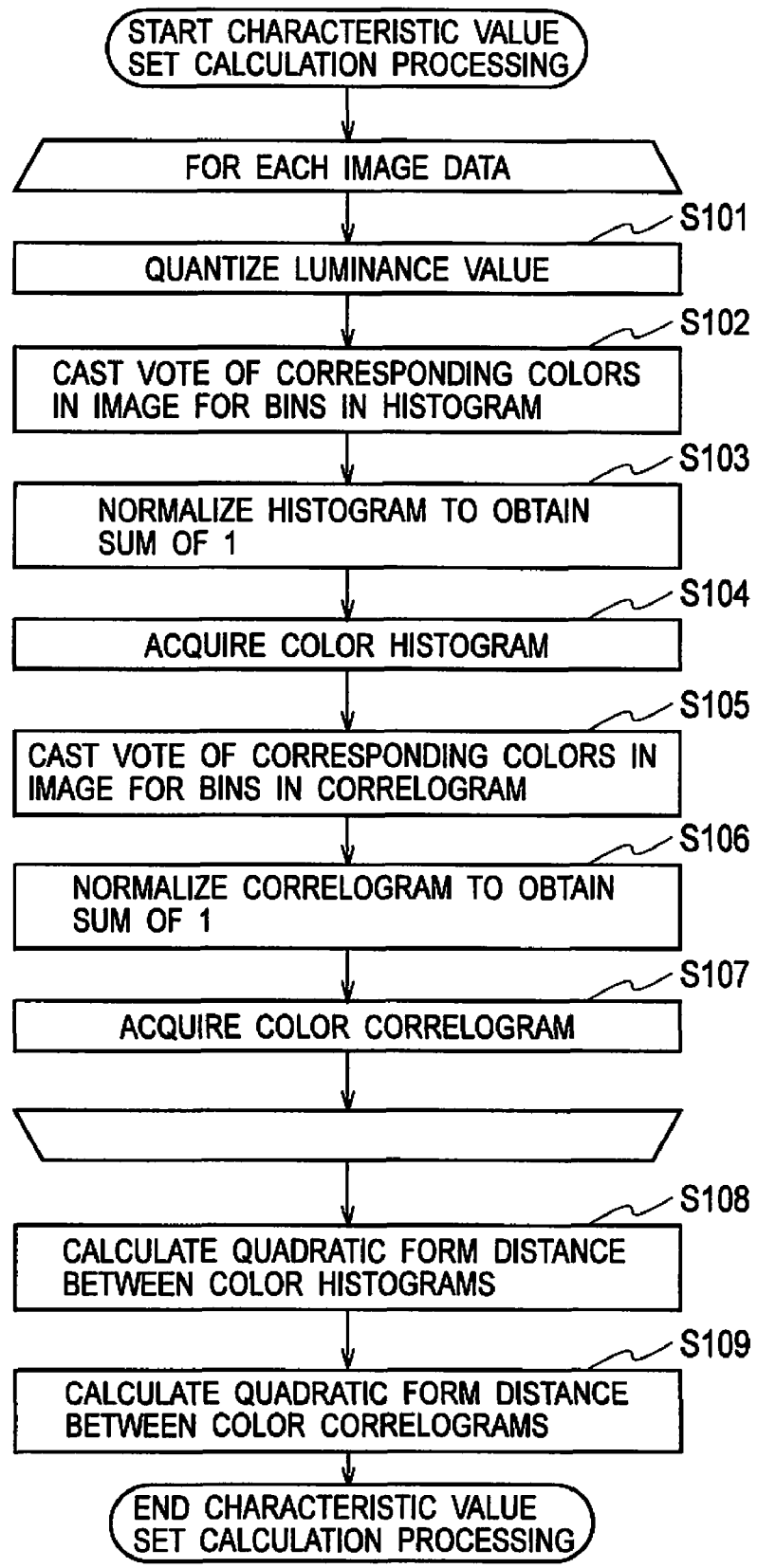
FIG. 4 is a flowchart showing characteristic value set calculation processing in the image classification device according to the preferred embodiment of the present invention.

With reference to FIG. 4, the processing performed by the feature amount calculation unit 11 will be described in detail. In an example shown in FIG. 4, description will be given of the case where a characteristic value set is calculated based on color histograms and color correlograms. When the characteristic value set is calculated by use of only the color correlogram, Steps S102 to S104 and S108 may be omitted.

In FIG. 4, processing of Steps S102 to S104 is processing of calculating a color histogram of each set of the image data; processing of Steps S105 to S107 is processing of calculating a color correlogram of each set of the image data; processing of Steps S108 and S109 is processing of calculating distances of the color correlograms and color histograms between each two of the sets of image data based on the color histograms and color correlograms of the sets of image data acquired in Steps S104 and S107.

First, in Steps S101 to S107, the characteristic value set calculation unit 11 calculates a color histogram and a color correlogram for each set of the image data stored in the image database 51.

To be more specific, in Step S101, the characteristic value set calculation unit 11 quantizes a luminance value of each pixel in the image data. Here, description is given of the case where the following processing is executed based on the luminance value. However, the processing may be executed based on an RGB value of each of pixels. Next, in Step S102, among bins in the histogram, the characteristic value set calculation unit 11 casts a vote for a pixel value corresponding to the pixel in the image data. In Step S103, the characteristic value set calculation unit 11 normalizes the histogram acquired in Step S102 to obtain a sum of 1. In Step S104, the characteristic value set calculation unit 11 acquires the value calculated in Step S103 as the color histogram of the image data.

Next, in Step S105, among bins in the correlogram, the characteristic value set calculation unit 11 casts a vote for a pixel value corresponding to the pixel in the image data. In Step S106, the characteristic value set calculation unit 11 normalizes the correlogram acquired in Step S105 to obtain a sum of 1. In Step S107, the characteristic value set calculation unit 11 acquires the value calculated in Step S106 as the color correlogram of the image data.

Next, in Step S108, the feature amount calculation unit 11 calculates a quadratic form distance between the color histograms of the image data and stores the calculated distance in the image database 51. Furthermore, in Step S109, the feature amount calculation unit 11 calculates a quadratic form distance between the color correlograms of the image data and stores the calculated distance in the image database 51. For example, when 50 sets of image data are stored in the image database 51, the quadratic form distance between the color histograms and the quadratic form distance between the color correlograms are 50×49/2, respectively.

Definitions of the color histogram and the color correlogram will be described below.

1. Color Histogram

The color histogram is defined as a distribution of probability of how often a specific color appears in an image. The color of each pixel in an image I is assumed to be quantized into m gradations $c_1, \ldots, c_m$, and I(p) is assumed to be a color of the pixel $p=(x, y) \in I$. Moreover, $I_c = \{p | I(p) = c\}$. In this event, a color histogram $h_{ci}(I)$ for a color $c_i$ of the image I is defined by the following Equation 1.

[Expression 1]

$$h_{c_i}(I) = Pr[p \in I_{c_i}]$$ (Equation 1)

In this event, $Pr[p \in I_{ci}]$ represents a probability of the pixel p having the color $c_i$ in the image I. The use of the color histogram thus defined as a feature enables image classification focusing on the color in the image.

2. Color Correlogram

Figure 5A:
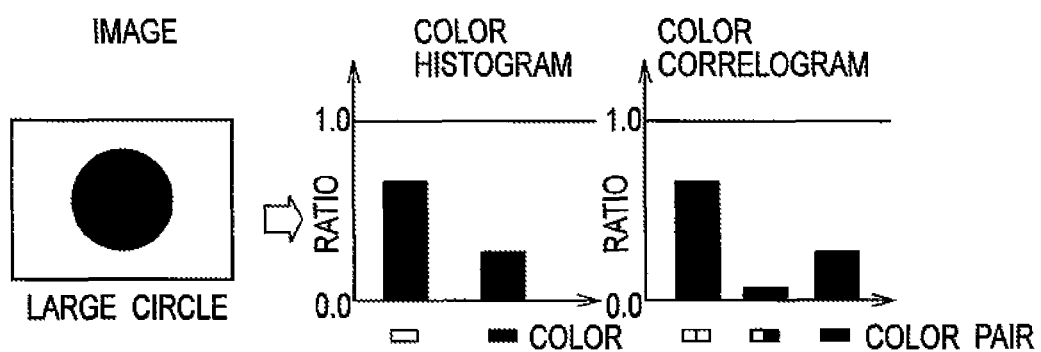
FIG. 5A is a diagram (No. 1) showing a color histogram and a color correlogram used by the image classification device according to the preferred embodiment of the present invention.
Figure 5B:
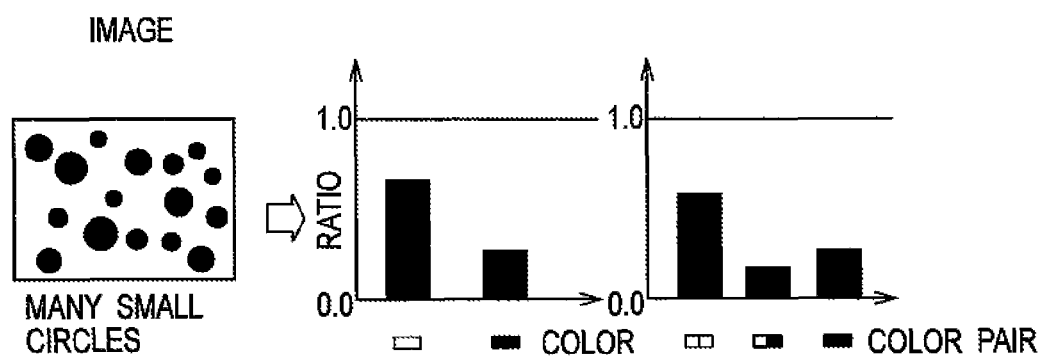
FIG. 5B is a diagram (No. 2) showing a color histogram and a color correlogram used by the image classification device according to the preferred embodiment of the present invention.

While the color histogram is defined as a distribution of probability of how often a specific color appears in an image, the color correlogram is defined as a distribution of probability of how specific colors of different pixels away from each other by a certain distance in an image co-occur. Accordingly, as shown in FIG. 5A and FIG. 5B, the color histogram and the color correlogram show different features. Specifically, an image having one large circle as shown in FIG. 5A and an image having many small circles as shown in FIG. 5B both have the same color histogram. However, the respective features of the images shown in FIGS. 5A and 5B can be shown by representing these images using color correlograms.

The definition of the color correlogram will be described below.

The color of each pixel in an image I is assumed to be quantized into m gradations $c_1, \ldots, c_m$, and I(p) is assumed to be a color of the pixel $p=(x, y) \in I$. Moreover, $I_c = \{p | I(p) = c\}$. In this event, a color correlogram represented by the following Expression 2 for colors $c_i$ and $c_j$ of the image I and a distance k is defined by the following Equation 2.

$$\gamma_{c_i, c_j}^{(k)}$$ [Expression 2]

[Expression 3]

$$\gamma_{c_i, c_j}^{(k)} = Pr[p_2 \in I_{c_j} | |p_1 - p_2| = k, p_1 \in I_{c_i}]$$ (Equation 2)

Here, a distance |p1−p2| between two pixels in Equation 2 is defined by the following Equation 3.

[Expression 4]

$$|p_1 - p_2| = \max(|x_1 - x_2|, |y_1 - y_2|)$$ (Equation 3)

Note, however, that, in the image classification device 1 according to the preferred embodiment, Equation 2 is replaced by the following Equation 4 in order to take into consideration a color distribution in a local region around the pixel.

[Expression 5]

$$\gamma_{c_i, c_j}^{(k)} = Pr[p_2 \in I_{c_j} | |p_1 - p_2| \leq k, p_1 \in I_{c_i}]$$ (Equation 4)

As described above, the image classification device 1 in the preferred embodiment of the present invention can take into consideration a difference in spatial color distribution in the image by using the color correlogram as a feature. Moreover, the image classification device 1 can automatically classify images with high accuracy.

In the preferred embodiment of the present invention, the image classification device 1 extracts the above two features from the classification target image and defines a distance therebetween for each set of the image data. Furthermore, the image classification device 1 calculates a similarity between images based on the defined distance and classifies the images based on the obtained similarity. The image classification device 1 according to the preferred embodiment of the present invention calculates features and performs multistage processing by focusing on a limited region, such as the whole image, edges, or a subject. Thus, the image classification device 1 can automatically classify the images with higher accuracy.

Next, description will be given of a definition of a similarity between images based on a distance between features.

The image classification device 1 according to the preferred embodiment of the present invention evaluates a similarity between images by use of distances between color histograms and between color correlograms calculated from images in the multiple sets of image data. Various distance scales are conceivable as a distance scale between the color histograms. Among those various distance scales, use of a quadratic form distance, which is reported to be a distance scale close to human perception, makes it possible to obtain an appropriate classification result. However, the quadratic form distance is defined as a distance between color histograms and thus cannot be used, as it is, as a distance scale between color correlograms. Therefore, the image classification device 1 according to the preferred embodiment of the present invention defines a distance between color correlograms by extending the concept of the quadratic form distance between color histograms.

A quadratic form distance between two color histograms is defined by the following Equation 5 using vectors $h_i$ and $h_j$ having values of the bins as elements.

[Expression 6]

$$D_h(h_i,h_j)=(h_i-h_j)^T S(h_i-h_j) \quad \text{(Equation 5)}$$

$S=[s_{xy}]$ in Equation 5 is called a color similarity matrix and defined by the following Equation 6 as a similarity of colors corresponding to xth and yth bins.

[Expression 7]

$$s_{xy}=e^{\alpha d_{xy}^2} \quad \text{(Equation 6)}$$

Note, however, that $\alpha$ is a positive constant and $d_{xy}$ is a color difference in a L*a*b color system of the colors corresponding to the xth and yth bins. The image classification device 1 according to the preferred embodiment of the present invention uses the quadratic form distance defined by Equation 5 as a distance between the color histograms.

The image classification device 1 according to the preferred embodiment of the present invention defines a distance scale between color correlograms by extending the concept of the above quadratic form distance between the color histograms. While each of the bins in the color histogram corresponds to a single color, each of the bins in the color correlogram corresponds to a combination of two colors. Therefore, the color similarity matrix S in Equation 5 cannot be used as it is. To address this, the image classification device 1 according to the preferred embodiment of the present invention changes $S=[s_{xy}]$ as described in the following Equations 7 and 8.

[Expression 8]

$$\tilde{S}=[\tilde{s}_{xy}] \quad \text{(Equation 7)}$$

[Expression 9]

$$\tilde{s}_{xy}=\min(e^{-\alpha(d_{x1y1}^2+d_{x2y2}^2)}, e^{-\alpha(d_{x1y2}^2+d_{x2y1}^2)}) \quad \text{(Equation 8)}$$

Note that the Xth Bin and the Yth Bin in the Color Correlogram Correspond to a combination of colors $x_1$ and $x_2$ and a combination of colors $y_1$ and $y_2$, respectively. In the preferred embodiment of the present invention, a distance between color correlograms is defined by the following Equation 9 using the following Expression 10 and vectors $c_i$ and $c_j$ having values of the bins as elements.

$$\tilde{S}=[\tilde{s}_{xy}] \quad \text{[Expression 10]}$$

[Expression 11]

$$D_c(c_i,c_j)=(c_i-c_j)^T\tilde{S}(c_i-c_j) \quad \text{(Equation 9)}$$

In the preferred embodiment of the present invention, a computational complexity is reduced by converting the color histogram as described below, in calculation of the quadratic form distance. First, eigenvalue decomposition of S is expressed by $S=U\Lambda U^T$. Note that $\Lambda$ is a diagonal matrix in which eigenvalues of S are arranged in descending order, and U is a matrix in which corresponding eigenvectors are arranged. Here, by use of a diagonal matrix $\Lambda_l$ in which higher l eigenvalues in $\Lambda$ are arranged and a matrix $U_l$ in which corresponding eigenvectors are arranged, n-dimensional color histograms $h_i$ and $h_j$ are converted into l-dimensional vectors, represented by the following Expression 12, by the following Equation 10.

$$h_i', h_j' \quad \text{[Expression 12]}$$

[Expression 13]

$$h_i'=\Lambda_l^{1/2}U_l^T h_i$$

$$h_j'=\Lambda_l^{1/2}U_l^T h_j \quad \text{(Equation 10)}$$

By using the vectors represented by the following Expression 14, which are calculated by Equation 10, a distance between $h_i$ and $h_j$ on a 1-dimensional space is defined by the following Equation 11.

$$h_i', h_j' \quad \text{[Expression 14]}$$

[Expression 15]

$$D_h^l(h_i,h_j)=(\tilde{h}_i-\tilde{h}_j)^T(\tilde{h}_i-\tilde{h}_j) \quad \text{(Equation 11)}$$

In this event, $Dh(h_i, h_j)$ in Equation 5 can be approximated by a distance on the 1-dimensional space, which is represented by the following Expression 16.

$$D_h^l(h_i,h_j) \quad \text{[Expression 16]}$$

In the preferred embodiment of the present invention, similar images are classified by use of this low-dimensional quadratic form distance. Also in calculation of a quadratic form distance between color correlograms, Equation 9 is approximated by the following Equation 12 as in the case of the calculation of the quadratic form distance between the color histograms. In this way, a computational complexity is reduced.

[Expression 17]

$$D_c^l(c_i,c_j)=(c_i'-c_j')^T(c_i'-c_j') \quad \text{(Equation 12)}$$

Note that the Following Equation 13 is Established for the Above Equation 12.

[Expression 18]

$$c_i'=\tilde{\Lambda}_l^{1/2}\tilde{U}_l^T c_i$$

$$c_j'=\tilde{\Lambda}_l^{1/2}\tilde{U}_l^T c_j \quad \text{(Equation 13)}$$

In the preferred embodiment of the present invention, the image classification device 1 evaluates a similarity between images by using the vectors represented by the following Expression 19 as feature vectors and the distances represented by the following Expression 20, thereby classifying the images.

$$h_i', h_j'$$ [Expression 19]

$$D_h^l(h_i, h_j), D_c^l(c_i, c_j)$$ [Expression 20]

(Cluster Processing Unit)

The first clustering unit 12, the second clustering unit 13, and the cluster integration unit 14 will be described.

Figure 6:
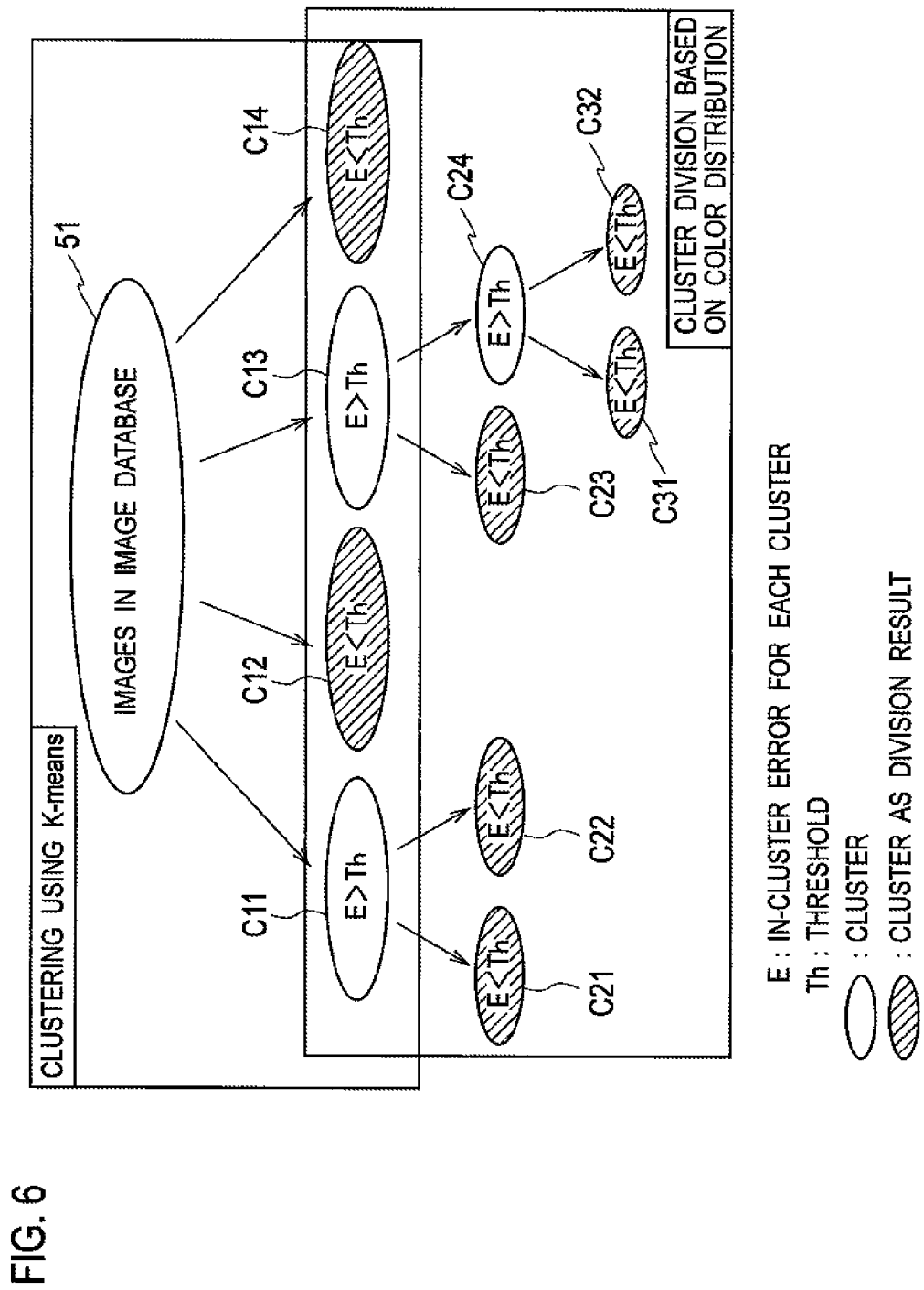
FIG. 6 is a diagram showing cluster division performed by a first clustering unit and a second clustering unit in the image classification device according to the preferred embodiment of the present invention.

In the preferred embodiment of the present invention, high-accuracy automatic image classification is achieved by focusing and performing multistage processing on colors in images and a distribution thereof. First, images are classified by use of the K-means method based on a quadratic form distance between color correlograms while focusing on a distribution of colors in images. Specifically, the image classification device 1 classifies image data groups stored in the image database 51 by use of the K-means method to generate clusters C11, C12, C13 and C14 as shown in FIG. 6.

However, in the classification using the K-means method, a feature of one image is expressed by use of only a single color correlogram. Accordingly, more detailed features in the image are not taken into consideration. Thus, there is a possibility that sufficient classification accuracy is not obtained at this point. Therefore, in the preferred embodiment of the present invention, automatic image classification with higher accuracy is achieved by obtaining a more accurate classification result by use of more detailed features in the image.

The preferred embodiment of the present invention focuses on edges, which are important features in the image, as the more detailed features. The image classification device 1 detects edge pixels from the image and divides each of the obtained clusters by use of a color correlogram calculated from only the edge pixels and pixels therearound. Here, the edge pixels are edges acquired by use of a Sobel filter, and are not necessarily edges of the subject. For example, the image classification device 1 further divides a cluster, among the clusters obtained by division by the K-means method, having a greater in-cluster error than a predetermined threshold Th. In the example shown in FIG. 6, the clusters having the greater in-cluster errors than the predetermined threshold Th are the clusters C11 and C13. Thus, the image classification device 1 divides the cluster C11 into clusters C21 and C22. Furthermore, the image classification device 1 divides the cluster C13 into clusters C23 and C24. The cluster C24 thus obtained has a greater in-cluster error than the predetermined threshold Th. Thus, the image classification device 1 further divides the cluster C24 into cluster C31 and cluster C32. In this manner, the image classification device 1 divides the clusters so that the in-cluster error of each of the clusters becomes smaller than the predetermined threshold Th. Thus, in the preferred embodiment of the present invention, an accurate classification result can be obtained by taking into consideration a more detailed color distribution in the image.

However, the division of the clusters in this event may become excessive division. Therefore, the image classification device 1 adds cluster reintegration processing by use of the color histogram and color correlogram obtained from the subject in order to suppress influences of excessive division. Thus, the image classification device 1 can accurately classify the images into groups of similar images. Specifically, the image classification device 1 integrates any clusters considered to contain the same subject among the seven clusters C21, C22, C12, C23, C31, C32 and C14 as the classification result to obtain six clusters or less.

Each of the processing steps will be described in detail below.

(First Clustering Unit)

The first clustering unit 12 according to the preferred embodiment of the present invention performs clustering by use of the K-means method to classify N classification target images $f_i$ (i=1, ..., N) into multiple sets. Here, the clustering using the K-means method is a kind of nonhierarchical clustering method.

Figure 7:
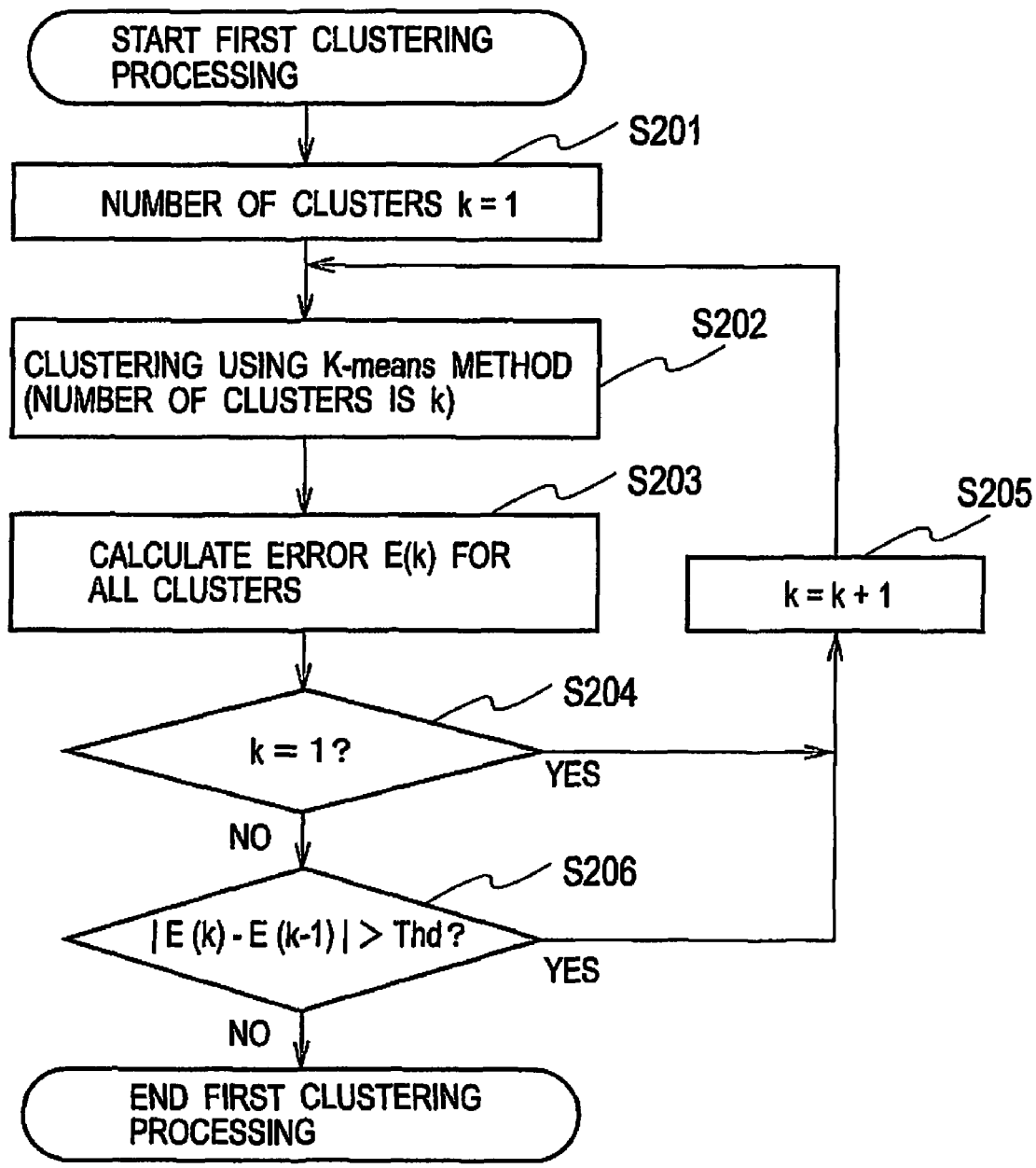
FIG. 7 is a flowchart showing first clustering processing by the image classification device according to the preferred embodiment of the present invention.

With reference to FIG. 7, description will be given of first clustering processing performed by the first clustering unit 12 according to the preferred embodiment of the present invention.

In Step S201, the first clustering unit 12 first sets the number K of clusters to 1. Next, in Step S202, the first clustering unit 12 performs clustering to set the number of clusters to K. In this event, the first clustering unit 12 calculates a clustering error E(k) for all the clusters in Step S203.

If the number K of clusters is 1 in Step S204, the first clustering unit 12 increments K in Step S205. Furthermore, the first clustering unit 12 returns to Step S202 to perform clustering to set the number of clusters to K.

On the other hand, if the number K of clusters is not 1 in Step S204 and if a difference between the clustering error E(k) for the current number of clusters and a clustering error E(k−1) for the number of clusters smaller by 1 than the current number of clusters is equal to or greater than a predetermined threshold in Step S206, the first clustering unit 12 increments K in Step S205. Furthermore, the first clustering unit 12 returns to Step S202 to perform clustering to set the number of clusters to K.

On the other hand, if the difference between the clustering errors does not exceed the predetermined threshold in Step S206, the clustering error is regarded as being converged in the state of the current number of clusters. Thus, the first clustering unit 12 terminates the first clustering processing.

Here, the processing performed by the first clustering unit 12 will be described in detail.

The first clustering unit 12 according to the preferred embodiment of the present invention generates a feature vector to be used for the K-means method. For each of $f_i$, the first clustering unit 12 quantizes R, G, and B luminance values into corresponding m gradations and calculates a color correlogram for a distance $k_1$. Here, $k_1$ is a previously given value. A 1-dimensional vector $c'_i$ is calculated by applying Equation 13 to the obtained color correlogram and is set to be the feature vector. The K-means method is applied to the feature vector obtained by the above processing. However, in the K-means method, a clustering result varies according to an initial cluster and the number of clusters. Therefore, in the preferred embodiment of the present invention, a clustering error $E_k$ represented by the following Equation 14 is used to evaluate the clustering result.

[Expression 21]

$$E_K = \frac{1}{N} \sum_{k=1}^{K} \sum_{h'_i \in C_k} (h'_i - v_k)^T (h'_i - v_k) \quad \text{(Equation 14)}$$

Note that $C_k$ and $v_k$ (k=1, ..., K; K is the number of clusters) represent a kth cluster and a center vector thereof. In the preferred embodiment of the present invention, the number K of clusters is changed as K=1, 2, . . . . The first clustering unit 12 applies the K-means method M times while randomly changing the initial value for each cluster. The first clustering unit 12 sets a result having a minimum value of $E_K$ as a clustering result when the number of clusters is K.

To determine whether or not to terminate clustering, the concept of scree plot is used. The scree plot is used to determine the number of principal components in principal component analysis. The scree plot includes plotting eigenvalues of principal components in order from a first principal component, and employing the number of principal components before a difference between two points becomes small. In the preferred embodiment of the present invention, the number of principal components is associated with the number of clusters and the eigenvalues are associated with $E_k$ and, when $|E_k - E_{k-1}| < TH_{c1}$ is satisfied, the current state is set to be a final clustering result.

(Second Clustering Unit)

Since the classification result obtained by applying the K-means method focuses on the color distribution of the whole image, detailed features of the image are not taken into consideration. Thus, images obtained by imaging different subjects may belong to the same cluster. Therefore, the image classification device 1 obtains a more accurate classification result by dividing each of the clusters by use of more detailed features. Specifically, the image classification device 1 focuses on edges as the detailed features of the image and takes into consideration a color relationship between edge pixels and pixels around the edge pixels, thereby obtaining a more accurate classification result. Here, the edge pixels are edges acquired by use of a Sobel filter, and are not necessarily edges of the subject. Moreover, each of the pixels around the edge pixels is one having coordinates (a, b) at which a distance $k_2$ from the edge pixel satisfies an inequality represented by the following Expression 22 when the edge pixel has coordinates (x, y).

$$\sqrt{(x-a)^2 + (x-b)^2} \leq k_2 \qquad \text{[Expression 22]}$$

Here, $k_2$ is a previously given parameter.

Figure 8:
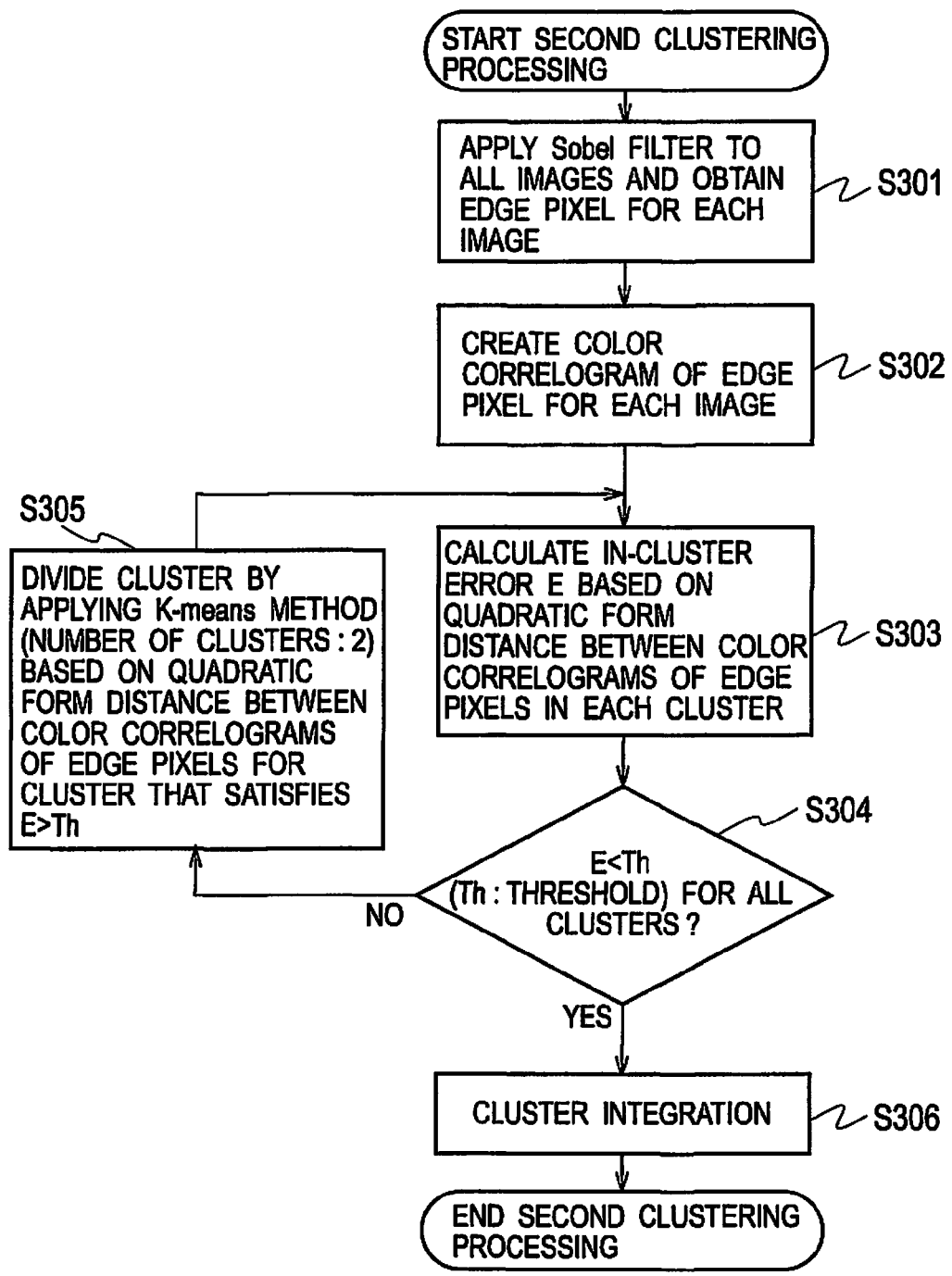
FIG. 8 is a flowchart showing second clustering processing by the image classification device according to the preferred embodiment of the present invention.

With reference to FIG. 8, description will be given of a second clustering processing performed by the second clustering unit 13 according to the preferred embodiment of the present invention.

First, in Step S301, the second clustering unit 13 applies a Sobel filter to all the sets of image data stored in the image database 51 and acquires an edge image in each set of the image data. In Step S302, the second clustering unit 13 generates a color correlogram of the edge image acquired in Step S301 for each set of the image data.

Next, in Step S303, the second clustering unit 13 calculates an in-cluster error E for each of the clusters generated by the first clustering unit 12. This in-cluster error E is based on a quadratic form distance between the color correlograms of the edge images generated in Step S302 for the image data belonging to the cluster. This quadratic form distance between the color correlograms in the edge portions of each set of the image data is preferably stored in the image database 51.

In Step S304, the second clustering unit 13 determines whether or not the in-cluster errors E of all the clusters are less than a predetermined threshold. If there is any cluster having the in-cluster error E not less than the threshold, the second clustering unit 13 extracts the cluster having the in-cluster error E not less than the threshold in Step S305. Furthermore, the second clustering unit 13 divides the extracted cluster into two halves. In this division, a K-means method having K=2 is used based on the quadratic form distance between the color correlograms of the edge pixels. Furthermore, the second clustering unit 13 returns to Step S303 and calculates an in-cluster error E for each of the clusters obtained by division in Step S305. The second clustering unit 13 determines in Step S305 whether or not the in-cluster errors E of all the clusters are less than the threshold.

The processing of Step S303 to Step S305 is repeated until it is determined that the in-cluster errors E of all the clusters are less than the threshold. When the in-cluster errors E of all the clusters are less than the threshold, the second clustering processing is terminated.

Here, the processing performed by the second clustering unit 13 will be described in detail.

Figures 9, 10:
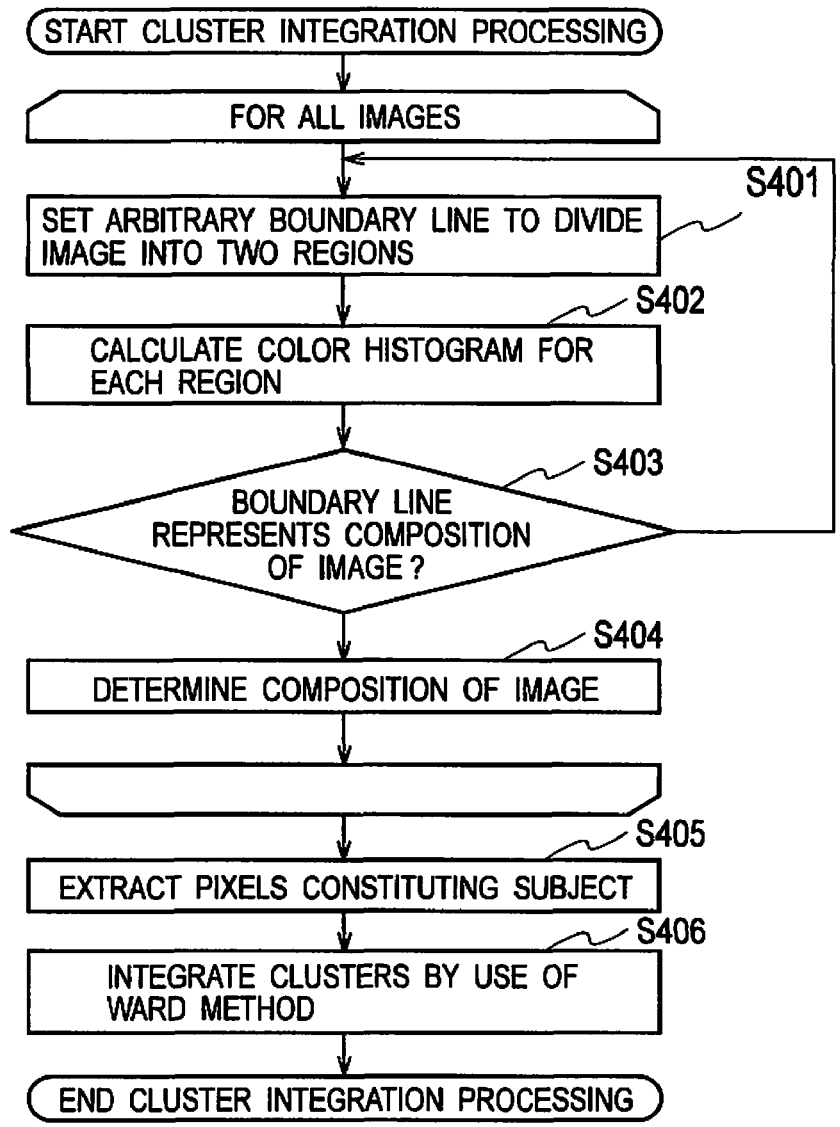
FIG. 9 is a diagram showing positions of pixels used for edge strength definition using a Sobel filter in the second clustering unit of the image classification device according to the preferred embodiment of the present invention.
FIG. 10 is a flowchart showing cluster integration processing in the image classification device according to the preferred embodiment of the present invention.

First, edge pixels in each image are detected by use of the Sobel filter. In this event, provided that symbols shown in FIG. 9 are assigned to 3×3 adjacent pixel values of the pixels, an edge strength $e_s$ obtained by the Sobel filter is defined by the following Equations 15 to 17.

[Expression 23]

$$e_s = \sqrt{e_x^2 + e_y^2} \qquad \text{(Equation 15)}$$

$$e_x = |(a-c) + 2(d-f) + (g-i)| \qquad \text{(Equation 16)}$$

$$e_y = |(a-g) + 2(b-h) + (x-i)| \qquad \text{(Equation 17)}$$

However, since this method targets color images for classification, Equations 16 and 17 are changed to the following Equations 18 and 19.

[Expression 24]

$$e_x = \|a-c\| + 2\|d-f\| + \|g-i\| \qquad \text{(Equation 18)}$$

$$e_y = \|a-g\| + 2\|b-h\| + \|c-i\| \qquad \text{(Equation 19)}$$

Here, for example, $\|a-c\|$ represents a color difference between a and c in an L*a*b color space.

In the preferred embodiment of the present invention, the edge pixels are detected by use of the Sobel filter thus extended. By dividing each of the clusters obtained by use of the K-means method focusing on the edges thus acquired, a more accurate classification result is obtained. Since the above processing focuses on the edges, a color correlogram is prepared for a distance $k_2$ ($k_2 < k_1$) from the edge pixel obtained by use of the above extended Sobel filter. Thereafter, use of a feature vector represented by the following Expression 25, which is calculated by use of Equation 13, enables the processing focusing on the edges.

$$c_i' \qquad \text{[Expression 25]}$$

By use of the feature vector thus obtained, each of the clusters is further divided into two clusters by the K-means method.

The above processing is performed until in-cluster errors $E(C_k)$, each obtained by the following Equation 20, of all the clusters satisfy $E(C_k) < TH_d$.

[Expression 26]

$$E(C_k) = \frac{1}{n_k} \sum_{c_i' \in C_k} D_c(c_i', v_k) \qquad \text{(Equation 20)}$$

Note that $n_k$ represents the number of classification target images which belong to the cluster $C_k$. The above processing makes it possible to divide each of the clusters while focusing on the edge which is the important feature of the image.

(Cluster Integration Unit)

The above processing allows the image classification device 1 to divide each of the clusters obtained by use of the K-means method by focusing on the edge which is the important feature of the image. However, there is a case that excessive division occurs along with the above division and images obtained by imaging the same subject are divided into multiple clusters. Therefore, in the preferred embodiment of the present invention, the divided clusters are integrated by focusing on the subject, thereby obtaining a final classification result.

With reference to FIG. 10, description will be given of cluster integration processing performed by the cluster integration unit 14 according to the preferred embodiment of the present invention.

First, the cluster integration unit 14 executes processing of Step S401 to Step S404 for all the image data stored in the image database 51. In the processing of Step S401 to Step S404, the cluster integration unit 14 determines a composition of the image data.

In Step S401, the cluster integration unit 14 sets an arbitrary boundary line for one set of the image data stored in the image database 51 to divide the image into two regions. Next, in Step S402, for each of the two regions obtained by division in Step S401, the cluster integration unit 14 calculates a color histogram for pixels positioned in the region.

Next, in Step S403, based on a quadratic form distance between the color histograms in the two regions, the cluster integration unit 14 determines whether or not the boundary line set in Step S401 represents the composition of the image.

Moreover, the processing of Steps S401 to S404 is repeated by changing a direction of the boundary line as shown in FIG. 12A to FIG. 12D. Thus, the cluster integration unit 14 can divide the image data into pixels within the boundary line and pixels outside the boundary line.

When the processing of Step S401 to Step S404 is finished for all the image data, the cluster integration unit 14 performs Step S405. In Step S405, the cluster integration unit 14 extracts pixels constituting a subject based on features of the pixels within the boundary line and the pixels outside the boundary line.

Furthermore, based on the pixels of the subject extracted in Step S405, the cluster integration unit 14 integrates the clusters containing the images having pixels of a similar subject. Specifically, the cluster integration unit 14 integrates clusters having similar subjects, among the multiple clusters, into one cluster. Information on the cluster to which each of the image data thus obtained belongs is preferably stored in the image database 51.

Here, the processing performed by the cluster integration unit 14 will be described in detail.

Figure 11A:
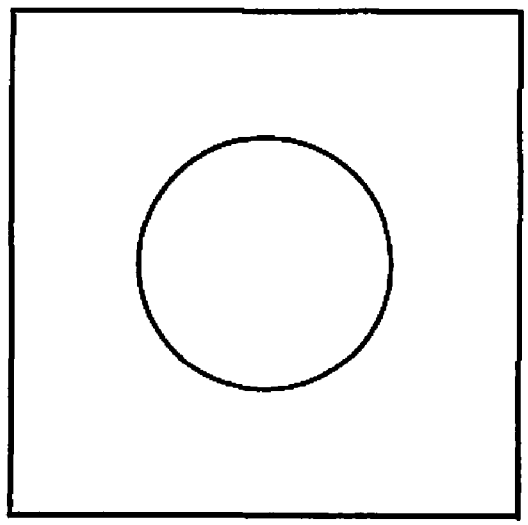
FIG. 11A is a diagram (No. 1) showing a composition in a cluster integration unit of the image classification device according to the preferred embodiment of the present invention.
Figure 11B:
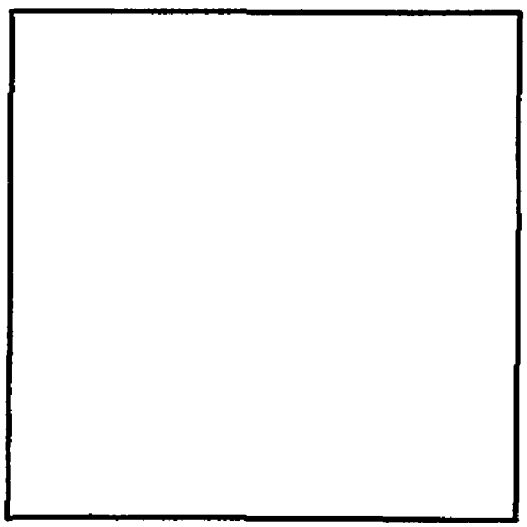
FIG. 11B is a diagram (No. 2) showing a composition in the cluster integration unit of the image classification device according to the preferred embodiment of the present invention.

In the preferred embodiment, upon estimation of the pixels constituting the subject, classification target images are classified roughly into two compositions shown in FIGS. 11A and 11B based on rough color distributions thereof.

Figure 11C:
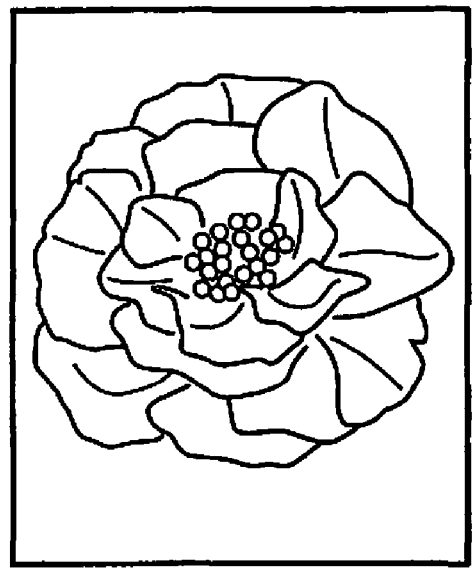
FIG. 11C is a diagram (No. 3) showing a composition in the cluster integration unit of the image classification device according to the preferred embodiment of the present invention.

Composition 1: Composition in which a subject lays in an image (see FIG. 11A). For example, an image in which a subject is imaged near the center thereof as shown in FIG. 11C.

Figure 11D:
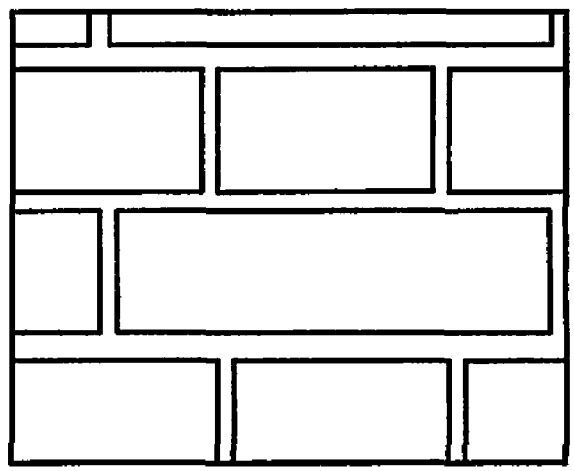
FIG. 11D is a diagram (No. 4) showing a composition in the cluster integration unit of the image classification device according to the preferred embodiment of the present invention.
Figure 12A:
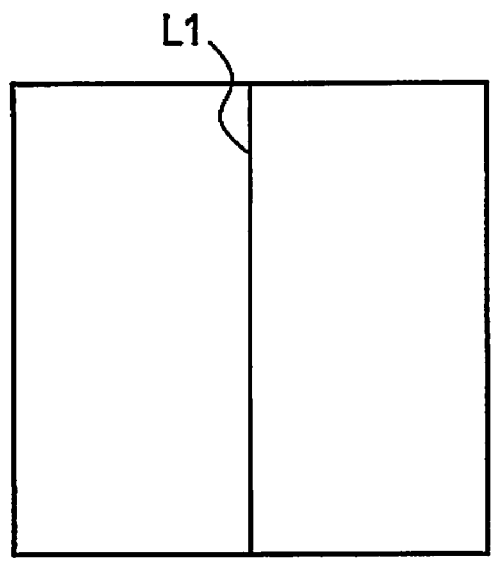
FIG. 12A is a diagram showing a boundary line L1 in the cluster integration unit of the image classification device according to the preferred embodiment of the present invention.
Figure 12B:
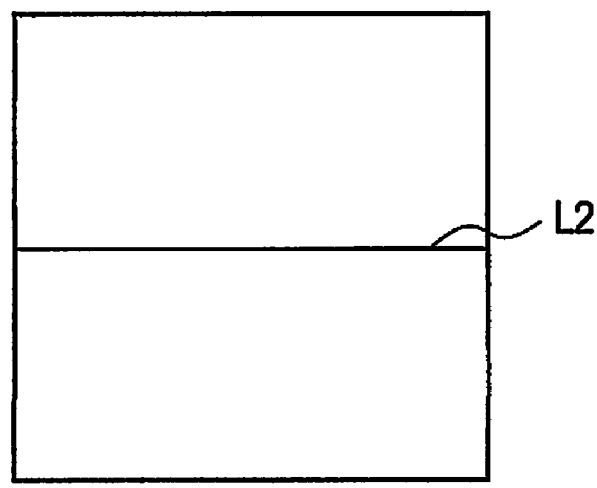
FIG. 12B is a diagram showing a boundary line L2 in the cluster integration unit of the image classification device according to the preferred embodiment of the present invention.
Figure 12C:
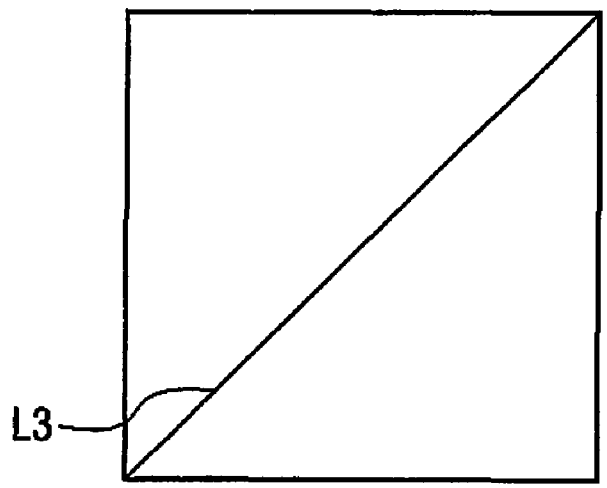
FIG. 12C is a diagram showing a boundary line L3 in the cluster integration unit of the image classification device according to the preferred embodiment of the present invention.
Figure 12D:
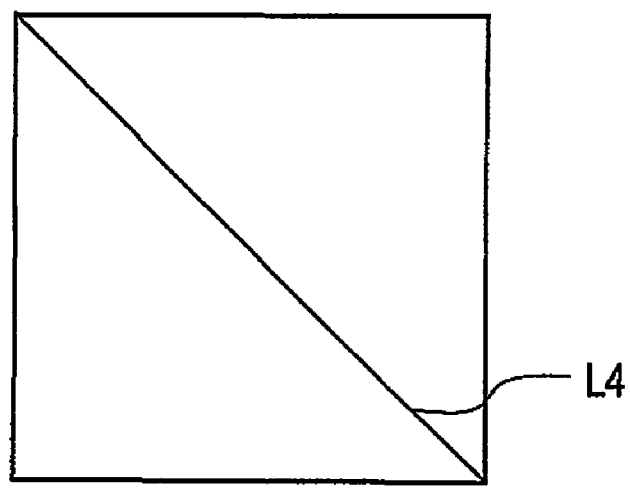
FIG. 12D is a diagram showing a boundary line L4 in the cluster integration unit of the image classification device according to the preferred embodiment of the present invention.

Composition 2: Composition other than Composition 1 (see FIG. 11B). For example, an image entirely occupied by a subject, such as a texture image, as shown in FIG. 11D.

A characteristic value set for estimating the composition will be defined below by use of the color histogram. In the preferred embodiment of the present invention, the cluster integration unit 14 divides an image into two regions $A_{i,j,1}$ and $A_{i,j,2}$ whose ratio of the number of pixels is j:1−j by translating boundary lines Li (i=1, ..., 4) shown in FIGS. 12A to 12D. In this event, a change in a quadratic form distance between color histograms in the two regions at the time when j is changed per 1/d from 1/d to (d−1)/d shows a specific trend due to the image composition. Therefore, in the preferred embodiment of the present invention, the characteristic value set used for determination of the composition defines the following Expression 27 calculated by the following Equations 21 and 22 using a quadratic form distance between $h_{i,j,1}$ and $h_{i,j,2}$.

$$D_i^{max}, D_i^{min} \quad \text{[Expression 27]}$$

[Expression 28]

$$D_i^{max} = \max_j D_h^i(h_{i,j,1}, h_{i,j,2}) \quad \text{(Equation 21)}$$

$$D_i^{min} = \min_j D_h^i(h_{i,j,1}, h_{i,j,2}) \quad \text{(Equation 22)}$$

The trend shown by the change in the quadratic form distance between the color histograms in the two regions for each of the compositions and a method for determining the image composition (Composition 1 or Composition 2) will be described below.

Composition 1: When the image having Composition 1 is divided into two regions, a quadratic form distance between color histograms in the two regions significantly varies depending on a position of the boundary line. Therefore, i to maximize the following Expression 29 is obtained and set as Expression 30.

$$D_i^{max} - D_i^{min} \quad \text{[Expression 29]}$$

$$\hat{i} \quad \text{[Expression 30]}$$

In this event, if the following inequality as expressed by Expression 31 is satisfied, the composition of the image is determined to be Composition 1.

$$D_{\hat{i}}^{max} - D_{\hat{i}}^{min} > TH_{diff} \quad \text{[Expression 31]}$$

Composition 2: An image having a composition other than Composition 1 is determined to have Composition 2.

In the preferred embodiment of the present invention, the pixels constituting the subject are estimated from the image having Composition 1. Since a background is generally in contact with edges of the image, a median value of luminance values in the L*a*b color system of the pixels contained in the regions represented by the following Expression 33, which are regions present at the edges of the image, is obtained by use of the boundary line represented by the following Expression 32, which is obtained in the determination of Composition 1.

$$\hat{i} \quad \text{[Expression 32]}$$

$$A_{\hat{i}, \frac{t}{d}, 1} \quad \text{And } A_{\hat{i}, \frac{d-1}{d}, 2} \quad \text{[Expression 33]}$$

Accordingly, the obtained median value is set to be a representative color of the pixels constituting the background of the image. The pixels whose color difference from the obtained representative color of the pixels constituting the background is greater than a threshold $TH_{object}$ are estimated by the image classification device 1 to be the pixels constituting the subject. Meanwhile, the image classification device 1 regards the whole image of the image having Composition 2 as one subject and estimates all the pixels to be the pixels constituting the subject.

The cluster integration unit 14 suppresses excessive division of the clusters by integrating the clusters by focusing on the pixels constituting the subject thus obtained, and accordingly obtains a final classification result. Since the above processing focuses on the subject, a color correlogram is calculated for a distance $k_1$ from the pixels estimated to constitute the subject as described above. Incidentally, it is known that the color correlogram shows a high similarity between very similar images but is likely to be affected by an imaging direction of the subject and the like. Therefore, in the preferred embodiment, a color histogram is obtained from the pixels constituting the subject and also a feature vector $h'_i$ is calculated by Equation 10. Thus, by using the calculated feature vector $h'_i$ together with the feature vector obtained by use of the color correlogram, the clusters are integrated. For cluster integration, the Ward method is used, which is one of the hierarchical clustering methods.

The Ward method is a method for defining a dissimilarity $S(C_k, C_l)$ between the clusters $C_k$ and $C_l$ by use of the following Equation 23 and sequentially integrating two clusters having the lowest dissimilarity.

[Expression 34]

$$S(C_k, C_l) = \frac{n_k n_l}{n_k + n_l}(v_k - v_l)^T(v_k - v_l) \quad \text{(Equation 23)}$$

In the preferred embodiment of the present invention, in order to take into consideration the color histogram and the color correlogram simultaneously, Equation 23 is changed to the following Equation 24.

[Expression 35]

$$S(C_k, C_l) = \frac{n_k n_l}{n_k + n_l}(v'_k - v'_l)^T A(v'_k - v'_l) \quad \text{(Equation 24)}$$

However, Expression 36 represents vectors obtained by vertically arranging the centers of the clusters $C_k$ and $C_l$ in the color histogram and the color correlogram.

$$v'_k, v'_l \quad \text{[Expression 36]}$$

Moreover, $A=[a_{ij}]$ is a matrix that satisfies the following Equation 25.

[Expression 37]

$$a_{ij} = \begin{cases} w1 & \text{if } i = j, i \leq l \\ w2 & \text{if } i = j, i > l \\ 0 & \text{if } i \neq j \end{cases} \quad \text{(Equation 25)}$$

In the preferred embodiment of the present invention, the integration processing is repeated until a minimum value of $S(C_k, C_l)$ takes a value higher than a threshold TH. By performing the processing described above, highly-accurate similar image classification focusing on the subject can be achieved.

The cluster integration unit 14 stores each of the characteristic value sets obtained by the above processing and the clustering result for each of the images and uses those for visualization. However, considering that a distance between the characteristic value sets is calculated in visualization, each of the characteristic value sets to be stored is a value converted by use of Equation 10 and Equation 13.

(Display Unit)

Based on the characteristic value sets of the images obtained by the processing performed by the classification unit 10 and the classification result thereof, the image classification device 1 according to the preferred embodiment of the present invention visualizes the image classification result. This visualization of the image classification result can be achieved by arranging the images on a multidimensional space.

Figure 13:
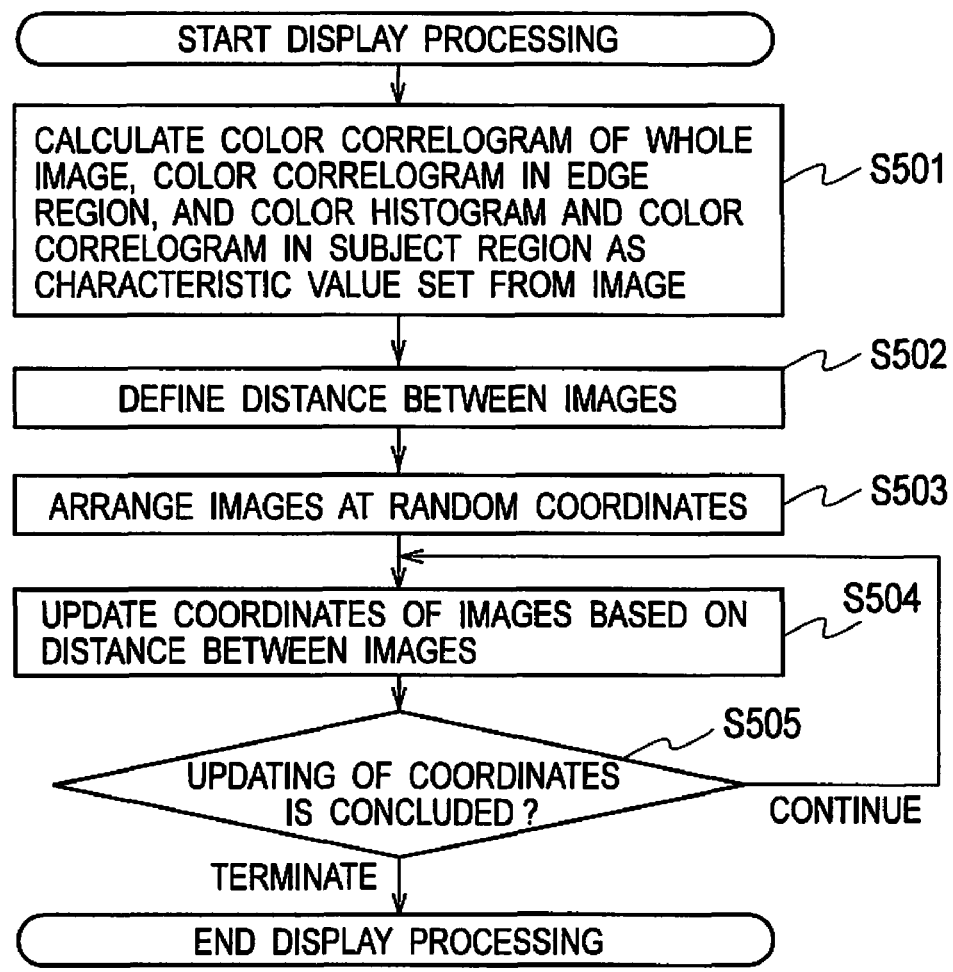
FIG. 13 is a flowchart showing display processing in the image classification device according to the preferred embodiment of the present invention.

With reference to FIG. 13, description will be given of display processing performed by the display unit 20 according to the preferred embodiment of the present invention.

First, in Step S501, the display unit 20 calculates a color correlogram of the whole image, a color correlogram in an edge region, and a color histogram and a color correlogram in a subject region for each set of the image data stored in the image database 51. For this calculation processing, the processing result values obtained by the classification unit 10 described above are preferably referred to. After the characteristic value sets are calculated, the display unit 20 defines a distance between each two sets of the image data in Step S502.

Next, in Step S503, the display unit 20 arranges thumbnails of the image data on a screen of the display device 105. In this event, the display unit 20 displays the thumbnails of the image data at random positions. Next, in Step S504, the display unit 20 updates coordinates of the thumbnails of the image data based on the distance between the image data defined in Step S502 and the clusters determined by the classification unit 10.

In Step S505, the display unit 20 determines whether or not updating the coordinates is concluded. If the updating is not concluded, the display unit 20 returns to Step S504 and further updates the coordinates of the thumbnails of the image data.

On the other hand, if it is determined in Step S505 that the display device 105 has concluded updating the coordinates, the display unit 20 terminates the display processing.

Here, description will be given of the definition of the distance between sets of the image data, which is defined by the display unit 20 in Step S502.

First, the display unit 20 creates a feature vector from each set of the image data. As elements of the feature vector, the display unit 20 uses the characteristic value sets described above, including the color correlogram of the whole image, the color correlogram in the edge region, and the color histogram and color correlogram in the subject region. The display unit 20 calculates a distance $D_I(i, j)$ between images based on the following Equation 26 from the feature vector $v_i$ of the image $I_i$ thus obtained.

[Expression 38]

$$D_I(i, j) = \begin{cases} (v_i - v_j)^T(v_i - v_j) \times w_{same} & \text{if } C_i = C_j \\ (v_i - v_j)^T(v_i - v_j) \times w_{other} & \text{otherwise} \end{cases} \quad \text{(Equation 26)}$$

Note, however, that clusters $C_i$ and $C_j$ are those that satisfy $I_i \in C_i$ and $I_j \in C_j$, respectively, and $w_{same}$ and $w_{other}$ are weights corresponding to the clusters to which the images belong.

In this event, in the preferred embodiment of the present invention, the display unit 20 reduces the distance between the images belonging to the same cluster by assigning values that satisfy $w_{same} < w_{other}$ to the weights $w_{same}$ and $w_{other}$. Thus, the images determined to belong to the same cluster from the classification result are arranged close to each other. In the preferred embodiment of the present invention, the display unit 20 updates the coordinates of the thumbnails of the images based on the distance between the images and displays a convergence process thereof by animation. Thus, the display unit 20 achieves visualization of the image classification result.

Figure 14:
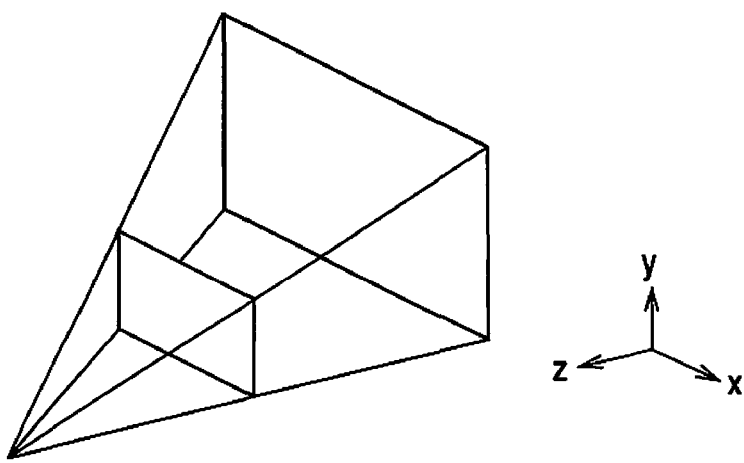
FIG. 14 is a diagram showing perspective transformation by a display unit of the image classification device according to the preferred embodiment of the present invention.

By sequentially moving the coordinates of the images based on the distance between the image data and visualizing the convergence process, the user is allowed to intuitively recognize the classification result. In the preferred embodiment of the present invention, the display unit 20 first randomly arranges images on a space and visualizes by animation how the images are gathered into groups of similar images. In the preferred embodiment of the present invention, as the multidimensional space, a three-dimensional space is selected, that is a maximum dimension that can be perceived by human beings. Specifically, the display unit 20 determines coordinates of the images in the three-dimensional space by reducing the dimensions of the features calculated from the classification target images to three dimensions, and arranges the images on the three-dimensional space. Next, the display unit 20 performs perspective transformation shown in FIG. 14 to express the images on a two-dimensional screen, thereby obtaining a final output image.

The display unit 20 according to the preferred embodiment of the present invention follows the following steps.

Step 1: Initial Arrangement

Figure 15:
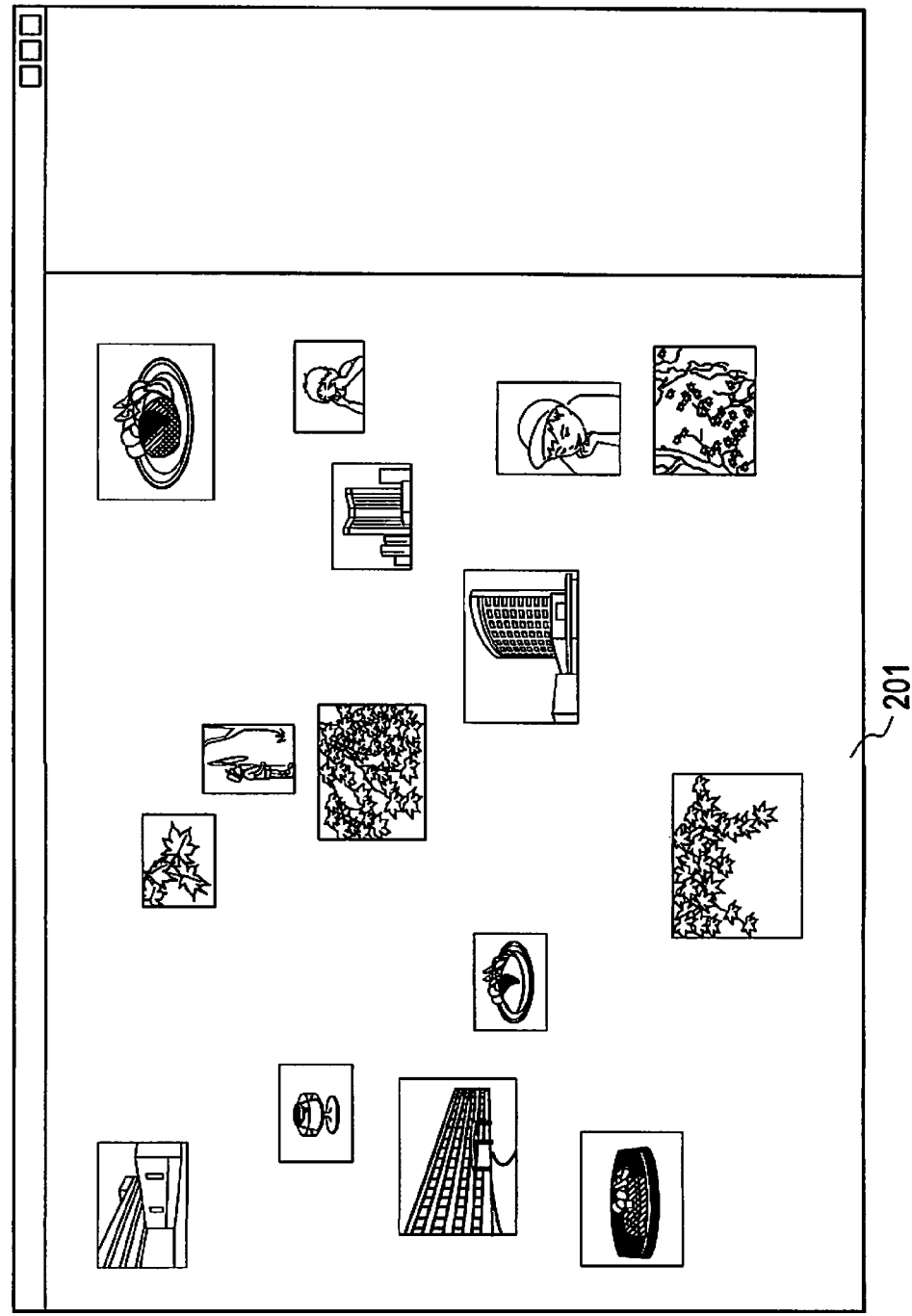
FIG. 15 shows an example of an initial screen displayed by the display unit of the image classification device according to the preferred embodiment of the present invention.

As shown in FIG. 15, the display unit 20 randomly arranges the images on the three-dimensional space and subjects the images to perspective transformation, thereby displaying the images on the two-dimensional screen. In this event, the display unit 20 draws a polyhedron at coordinates where each of the images is arranged and draws a target image on each of the faces of the polyhedron. Thus, the display unit 20 can present the position of the image on the three-dimensional space to the user in a user-friendly manner.

Step 2: Shift of Image

The display unit 20 calculates a shift amount of each image based on a distance between images, and changes coordinates of each image on the three-dimensional space. In this event, provided that a three-dimensional coordinate of an image $I_i$ is $p_i$, a shift amount thereof represented by the following Expression 39 is calculated based on the following Equations 27 and 28.

$$m_i^*$$ [Expression 39]

[Expression 40]

$$m_i^* = \arg\min_{|m_i| \leq \sqrt{3}} \sum_j |D_I(i,j) - D_I^{real}(i,j,m_i)|$$ (Equation 27)

$$D_I^{real}(i,j,m_i) = \|p_i + m_i - p_j\|$$ (Equation 28)

Note that the following Expression 41 represents a distance between the images $I_i$ and $I_j$ on the three-dimensional space when the coordinate $p_i$ of the image $I_i$ is moved by $m_i$.

$$D_I^{real}(i,j)$$ [Expression 41]

Therefore, the shift amount of the image, which is represented by the following Expression 42, is obtained as one that minimizes a difference between the previously defined distance $D_I(i, j)$ between images and an actual distance represented by the following Expression 43 on the three-dimensional space.

$$m_i^*$$ [Expression 42]

$$D_I^{real}(i,j)$$ [Expression 43]

Based on the image shift amount thus obtained, which is represented by the following Expression 44, the display unit 20 updates the coordinate of each image as expressed by the following Equation 29.

$$m_i^*$$ [Expression 44]

[Expression 45]

$$p_i \leftarrow p_i + m_i^*$$ (Equation 29)

Step 3: Repetition

The display unit 20 repeats Step 2 until the shift amount, which is represented by the following Expression 46, of every image is converged to 0.

$$m_i^*$$ [Expression 46]

Figure 16:
FIG. 16 shows an example of a result screen displayed in the display unit of the image classification device according to the preferred embodiment of the present invention.

Upon convergence to 0, a screen shown in FIG. 16 is displayed on the display device 105.

In FIG. 16, thumbnails of similar images, such as pictures representing maple leaves and pictures representing buildings, are arranged nearby. Meanwhile, thumbnails of images not similar to each other are arranged at a distance.

By the processing as described above, a distance between the thumbnails of image data approaches the previously defined distance $D_I(i, j)$. Accordingly, the thumbnails of similar image data are arranged close to each other.

Here, the processing of Step 2 and Step 3 will be described in detail. The coordinates of the thumbnails of each image data are moved in a direction of minimizing the following evaluation function.

$$f(m) = \Sigma_j |D_i(i,j) - D_I^{real}(i,j,m)|$$ [Expression 47]

Figure 17A:
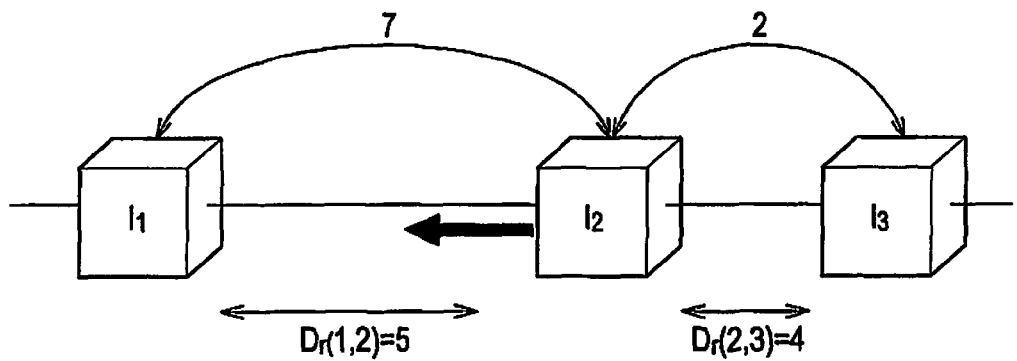
FIG. 17A is a diagram (No. 1) showing thumbnail movement in the display unit of the image classification device according to the preferred embodiment of the present invention.

Here, FIG. 17A shows an example where the coordinates of each image (the thumbnail of the image data) are limited to one dimension for convenience. As shown in FIG. 17A, it is confirmed that actual distances between each two images are "7" and "2" and the previously defined distances between each two images are "5" and "4". The display unit 20 uses these values to calculate an evaluation function when coordinates of an image $I_2$ are moved, and moves the image in a direction of minimizing the values.

(1) First Step

When the image is moved to the left by 1 f(−1)=|5−6|+|4−3|=2

When the image is not moved f(0)=|5−7|+|4−2|=4

When the image is moved to the right by 1 f(1)=|5−8|+|4−1|=6

Figure 17B:
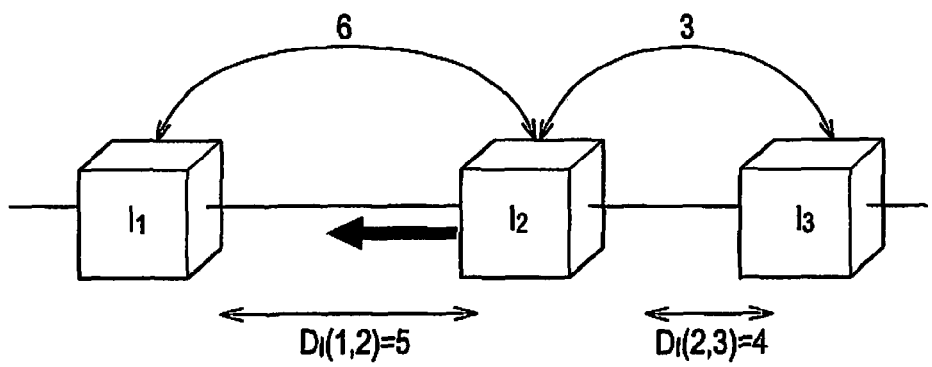
FIG. 17B is a diagram (No. 2) showing thumbnail movement in the display unit of the image classification device according to the preferred embodiment of the present invention.

The above shows that the evaluation function is minimized when the image is moved to the left. Therefore, in this case, the image $I_2$ is moved to the left. FIG. 17B shows positions of the respective images. The display unit 20 can arrange each image close to similar images by repeating the above processing.

(2) Second Step

The evaluation function is as follows in the next step.

When the image is moved to the left by 1 f(−1)=|5−5|+|4−4|=0

When the image is not moved f(0)=|5−6|+|4−3|=2

When the image is moved to the right by 1 f(1)=|5−7|+|4−2|=4

Figure 17C:
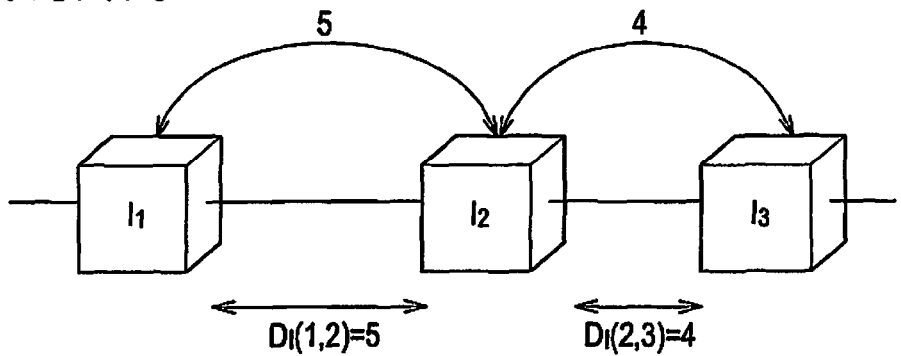
FIG. 17C is a diagram (No. 3) showing thumbnail movement in the display unit of the image classification device according to the preferred embodiment of the present invention.

Thus, the image $I_2$ is moved to the left. FIG. 17C shows positions of the respective images.

(3) Third Step

The evaluation function is as follows in the next step.

When the image is moved to the left by 1 f(−1)=|5−4|+|4−5|=2

When the image is not moved f(0)=|5−5|+|4−4|=0

When the image is moved to the right by 1 f(1)=|5−6|+|4−3|=2

In this event, the evaluation function is minimized when the image is not moved. Since the evaluation function is converged at this point, the display unit 20 terminates movement of the images (thumbnails of the image data). By performing the above processing for all the images until the evaluation function is converged, the display unit 20 achieves visualization of the image classification result.

Next, FIG. 15 and FIG. 16 will be described.

The display unit 20 according to the preferred embodiment of the present invention first displays an initial screen P201 shown in FIG. 15 on the display device 105. The initial screen P201 includes a classification process display part 201. The classification process display part 201 displays a state where the thumbnails of the image data are randomly arranged in Step 1 described above. This initial screen P201 is a screen obtained by randomly arranging the thumbnails of each image data on the three-dimensional space and then subjecting the thumbnails to perspective transformation.

Furthermore, the display device 105 displays the thumbnails of the image data being moved in Steps 2 and 3. Displaying the automatic classification process by use of animation in this manner allows the user to intuitively recognize the images contained in the database.

When the shift amount is converged as a result of repeating Step 2 and Step 3, a result screen P202 shown in FIG. 16 is displayed on the display device 105. The result screen P202 includes a classification result display part 202. In the classification result display part 202, similar images are displayed nearby while images not similar to each other are displayed at a distance.

On the screens shown in FIGS. 15 and 16, some control buttons for visualizing the process of moving the thumbnails of the image data are provided. Specifically, the following buttons are provided.

(1) Fast-Forward Button

When this button is clicked on, an animation speed is increased. Thus, if the user wishes to see a final convergence result, the display unit 20 can promptly present the result.

(2) Initial State Restoration Button

When this button is clicked on, the display unit 20 can restore the classification process to the initial state.

(3) Map Display/Hide Button

A map indicating a current position and a viewpoint direction is prepared on an upper right portion of the classification screen. Thus, the user can freely move in the three-dimensional space in which the images are arranged. Clicking on this button makes it possible to switch between display and hide of the map.

(4) Viewpoint Change Button

The display unit 20 enables the movement in the three-dimensional space in which the images are arranged and change in the viewpoint by dragging a mouse. Besides the above, the display unit 20 is also allowed to switch to any of four predetermined positions and viewpoints by the user clicking on one of four viewpoint change buttons.

On the initial screen P201 shown in FIG. 15, upon clicking on a classification start/pause button by the user, the display unit 20 reproduces the classification process by animation. Thereafter, classification target image groups are eventually gathered into groups of similar images as shown in the result screen P202 of FIG. 16. Thus, the display unit 20 can display the classification result. The user can freely move in the three-dimensional space and change the viewpoint by dragging the mouse in the classification process display unit 201 and the classification result display unit 202. The user can view the classification process and result from a free viewpoint. Thus, the user can intuitively recognize the images in the database. Moreover, even when the user has no query image or no clear search intention, he/she can search for desired images.

Moreover, the display unit 20 may display a result of displaying the images belonging to the same cluster as that of a specific image. In this event, it is preferable that image data belonging to the same cluster as that of the selected image data is also displayed together with the selected image data. The user can select images from the image data belonging to the same cluster as that of the selected image data. By clicking on one of the selected images, the user can select a new image.

As described above, the image classification device 1 according to the preferred embodiment of the present invention allows the user to intuitively recognize the images contained in the database by presenting to the user the classification process and classification result in the automatic image classification. Thus, even when the user has no query image or no clear search intention, the image classification device 1 can provide images desired by the user.

(Effects)

The image classification device 1 according to the preferred embodiment of the present invention visualizes the classification result on the three-dimensional space in displaying of the classification result. Thus, the image classification device 1 allows the user to efficiently view the classification result. Specifically, the image classification device 1 determines a distance on the three-dimensional space based on a dissimilarity between images, and arranges thumbnails of the images on the display device 105. Thus, a state where the thumbnails of the images in the database are gathered into groups of similar images is displayed on the display device 105.

Moreover, the image classification device 1 determines the distance between the images based on the dissimilarity. Therefore, the shorter the distance from a certain image, images more similar to the certain image are arranged on the display device 105. On the other hand, the farther away from the certain image, images more dissimilar to the certain image are arranged on the display device 105. Thus, when observing a very narrow range around the certain image upon display of the classification result, particularly similar images among the similar images are arranged nearby. Similarly, not very similar images are arranged farther away. Moreover, when observing a range including more images, similar images are arranged nearby and dissimilar images are arranged farther away. Since all the images in the database are arranged in the above manner, the image classification device 1 allows the user to efficiently view the classification result in an intuitively understandable manner.

Furthermore, the image classification device 1 according to the preferred embodiment of the present invention performs clustering processing in stages. Thus, the image classification device 1 can classify the images by taking into consideration not only the color distribution of the whole image but also more detailed features in the image. Specifically, by performing clustering based on the color distribution of the whole image, the image classification device 1 can classify the images into clusters of wholly similar images. Next, by dividing each of the clusters based on the color distribution in the edge region, the image classification device 1 can more accurately perform clustering. Furthermore, by estimating the subject present in the image and reintegrating the clusters based on the features of the subject, the image classification device 1 can classify the images by taking into consideration the subject that is the most important information in the image. Furthermore, by using the quadratic form distance as the distance scale in calculation of distances between color histograms and between color correlograms at each stage of the clustering, the image classification device 1 achieves classification closer to human visual perception.

As described above, first, the image classification device 1 according to the preferred embodiment of the present invention allows the first clustering unit 12 to roughly classify images based on the characteristic value set of the whole image. The image classification device 1 then allows the second clustering unit 13 to perform more detailed hierarchical classification by focusing on the edge portions which characterize the images. Furthermore, the cluster integration unit 14 integrates the clusters, which are excessively divided by the first clustering unit 12 and the second clustering unit 13, based on the features of the subjects so as to obtain clusters for the corresponding subjects. Lastly, by integrating the clusters based on the subject, the image classification device 1 can generate clusters which are likely to match to a search keyword entered by the user.

Modified Embodiment

An image classification device 1a according to a modified embodiment of the present invention can automatically search for an image when given a query image, by utilizing the classification function according to the preferred embodiment.

The image classification device 1a according to the modified embodiment of the present invention first extracts a characteristic value set from the inputted query image. A query image processing unit 30 in the image classification device 1a according to the modified embodiment of the present invention determines a cluster to which the query image belongs by comparing the extracted characteristic value set with those of images in a database. Here, characteristic value set calculation and classification of each image in the database have been previously completed. By using the characteristic value set and a clustering result of the query image together with the images in the database, a display unit 20 visualizes a search result on a three-dimensional space.

The image classification device 1a according to the modified embodiment of the present invention searches for an image similar to the inputted query image by extracting a characteristic value set from the query image and comparing the extracted characteristic value set with those of images in an image database 51. The image classification device 1a according to the modified embodiment of the present invention extracts all characteristic value sets used for classification of images from the inputted query image. Thereafter, a cluster to which the query image belongs is determined by comparing the query image with the images in the database, characteristic value set calculation and classification of each of the images previously completed. By using the thus obtained characteristic value sets of the query image and the cluster to which the query image belongs together with the image data in the image database 51, the display unit 20 visualizes a search result on the three-dimensional space.

Figure 18:
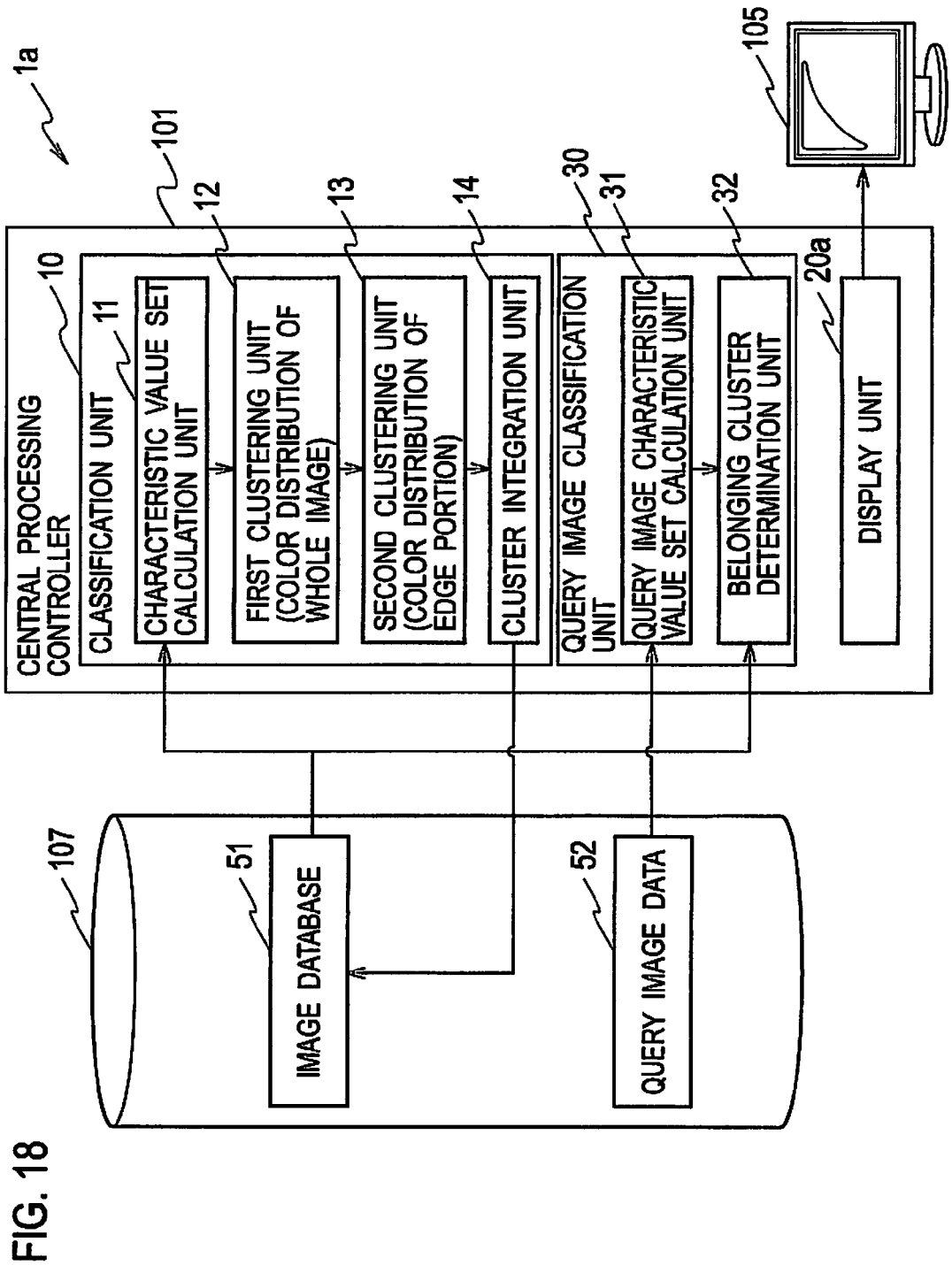
FIG. 18 is a functional block diagram of an image classification device according to a modified embodiment of the present invention.

With reference to FIG. 18, the image classification device 1a according to the modified embodiment of the present invention will be described.

The image classification device 1a according to the modified embodiment of the present invention is different from the image classification device 1 according to the preferred embodiment of the present invention shown in FIG. 1 in that the image classification device 1a includes the query image classification unit 30. The query image classification unit 30 includes a query image characteristic value set calculation unit 31 and a belonging cluster determination unit 32.

The query image characteristic value set calculation unit 31 calculates a feature vector of query image data 52. Here, the feature vector is a vector having, as parameters, a color correlogram of the whole image, a color correlogram in an edge portion, and a color histogram and a color correlogram in a subject region. The query image characteristic value set calculation unit 31 calculates a color correlogram of the whole image of the query image data 52, a color correlogram in an edge portion of the query image data 52, and a color histogram and a color correlogram in a subject region of the 52 query image data, and thus calculates a feature vector of the query image data 52.

The belonging cluster determination unit 32 determines a cluster to which the query image data 52 belongs among clusters generated by a cluster integration unit 14 based on the feature vector of the query image data 52. The belonging duster determination unit 32 calculates an average of the feature vectors of sets of the image data belonging to each of the clusters generated by the cluster integration unit 14. Thereafter, the cluster determination unit 32 determines a cluster that has the smallest distance from the feature vector of the query image data 52 as a cluster to which the query image belongs.

Figure 19:
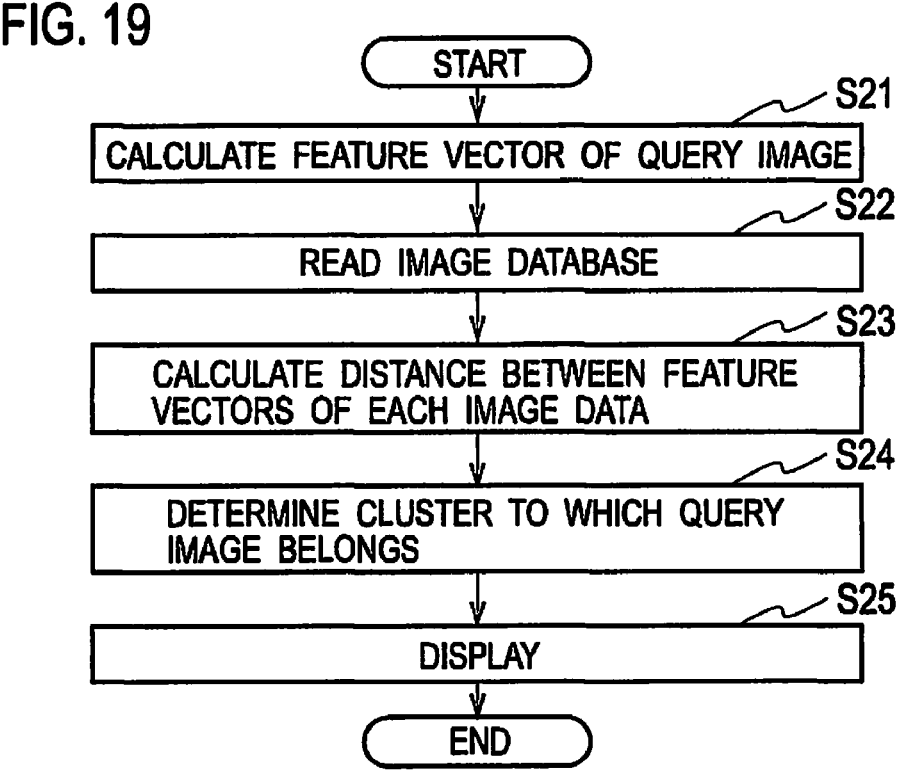
FIG. 19 is a diagram showing an outline of an image classification method according to the modified embodiment of the present invention.

With reference to FIG. 19, description will be given of an outline of image classification processing by the image classification device 1a according to the modified embodiment of the present invention.

First, in Step S21, the image classification device 1a calculates a feature vector of the query image data 52. Thereafter, in Step S22, the image classification device 1a reads sets of image data from the image database 51 and acquires a feature vector in each set of the image data.

Furthermore, in Step S23, the image classification device 1a calculates a distance between the feature vectors of the query image data 52 and each set of the image data. In Step S24, the image classification device 1a determines a cluster to which the query image data 52 belongs. In this event, the image classification device 1a determines a cluster that has the smallest distance calculated in Step S23 as the cluster to which the query image data 52 belongs.

Thereafter, in Step S25, the image classification device 1a displays on the display device 105 a classification process of the query image data 52 and the image data stored in the image database 51.

(Query Image Characteristic Value Set Calculation Unit)

Figure 20:
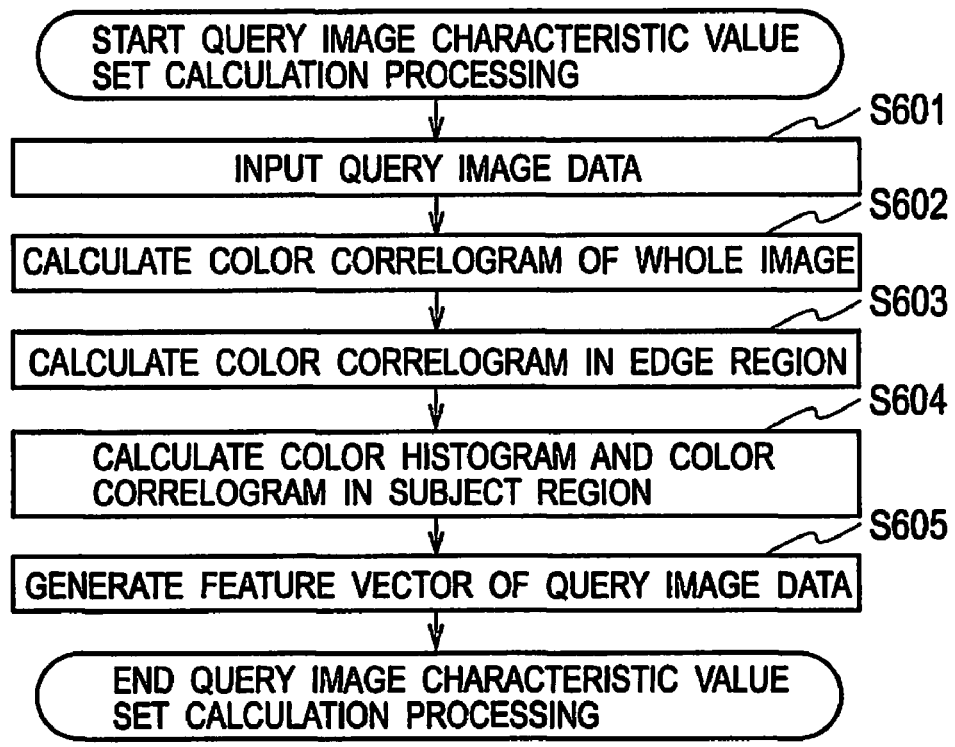
FIG. 20 is a flowchart showing query image characteristic value set calculation processing in the image classification device according to the modified embodiment of the present invention.

With reference to FIG. 20, description will be given of the query image characteristic value set calculation unit 31 according to the modified embodiment of the present invention.

First, the query image characteristic value set calculation unit 31 reads the query image data 52 from a storage device 107 in Step S601, and calculates a color correlogram of the whole image of the query image data 52 in Step S602. Next, in Step S603, the query image characteristic value set calculation unit 31 calculates a color correlogram in the edge portion of the query image data 52. Furthermore, the query image characteristic value set calculation unit 31 calculates a color correlogram in the subject region, in Step S604.

In Step S605, the query image characteristic value set calculation unit 31 generates a feature vector from the outputs in Step S602 to Step S604.

As the characteristic value set to be extracted, the query image characteristic value set calculation unit 31 uses the characteristic value set used for automatic image classification by the classification unit 10. Specifically, the query image characteristic value set calculation unit 31 calculates the color correlogram of the whole image, the color correlogram in the edge region, and the color histogram and color correlogram in the subject region. The obtained characteristic value sets of the color histogram and color correlograms are converted by use of Equation 10 and Equation 13 to calculate a similarity based on a quadratic form distance. The query image characteristic value set calculation unit 31 creates a vector having the values thus obtained as elements and sets this vector as a feature vector $v_{query}$.

(Belonging Cluster Determination Unit)

Figure 21:
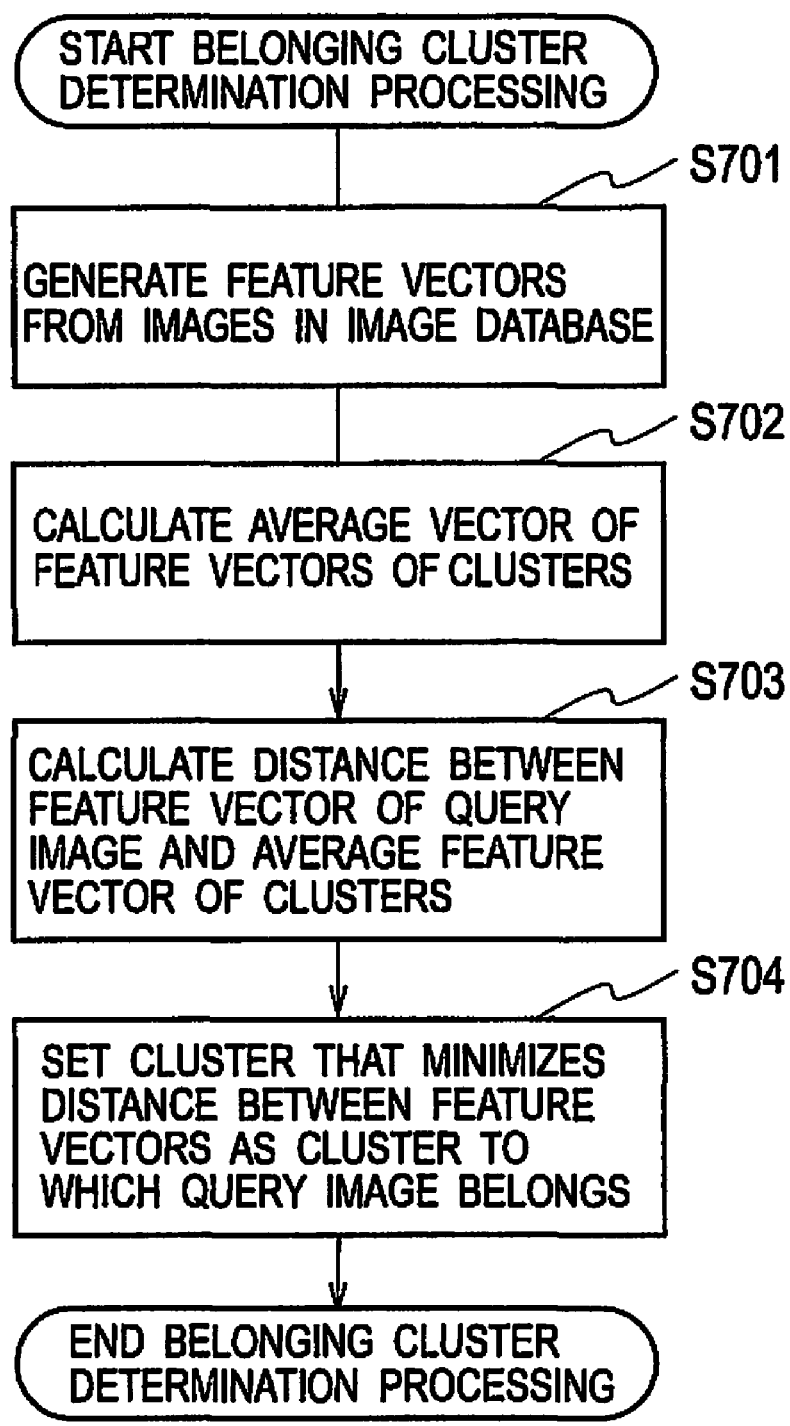
FIG. 21 is a flowchart showing belonging cluster determination processing in the image classification device according to the modified embodiment of the present invention.

With reference to FIG. 21, description will be given of the belonging cluster determination unit 32 according to the modified embodiment of the present invention.

First, in Step S701, the belonging cluster determination unit 32 generates a feature vector from each of the image data in the image database 51. Thereafter, in Step S702, the belonging cluster determination unit 32 calculates an average vector of the feature vector of each of the clusters generated by the cluster integration unit 14.

Next, in Step S703, the belonging cluster determination unit 32 calculates a distance between the feature vector of the query image data 52 and the average of the feature vectors of the clusters calculated in Step S702. Thereafter, in Step S704, the belonging cluster determination unit 32 determines a cluster that has the smallest distance between the feature vectors calculated in Step S703 as a cluster to which the query image data 52 belongs.

The belonging cluster determination unit 32 creates a feature vector similar to the feature vector of the query image data 52 by use of a previously calculated characteristic value set for each set of the image data in the image database 51. Thereafter, an average vector of the feature vectors of the clusters is calculated by use of the obtained feature vectors, and the obtained average vector is set as $v_i$. A distance between the feature vector $V_{query}$ of the query image and the average feature vector $v_i$ of the clusters is calculated by use of the following Equation 30.

[Expression 48]

$$D(v_{query}, v_i) = (v_{query} - v_i)^T (v_{query} - v_i) \quad \text{(Equation 30)}$$

A cluster having the feature vector $v_i$ that minimizes this $D(v_{query}, v_i)$ is set as a cluster to which the query image belongs.

The characteristic value set of the query image and the cluster to which the query image belongs, which are obtained by the above processing, are stored with the characteristic value sets and clusters of the images in the image database 51 and used for visualization.

(Display Unit)

A display part 20a according to the modified embodiment of the present invention adds to the image database 51 the feature value of the query image data 52 and information on the cluster to which the query image data belongs, which are obtained by the query image classification unit 30. Furthermore, the display part 20a performs visualization in the same way as the image classification device 1 described in the preferred embodiment of the present invention does.

Figure 22:
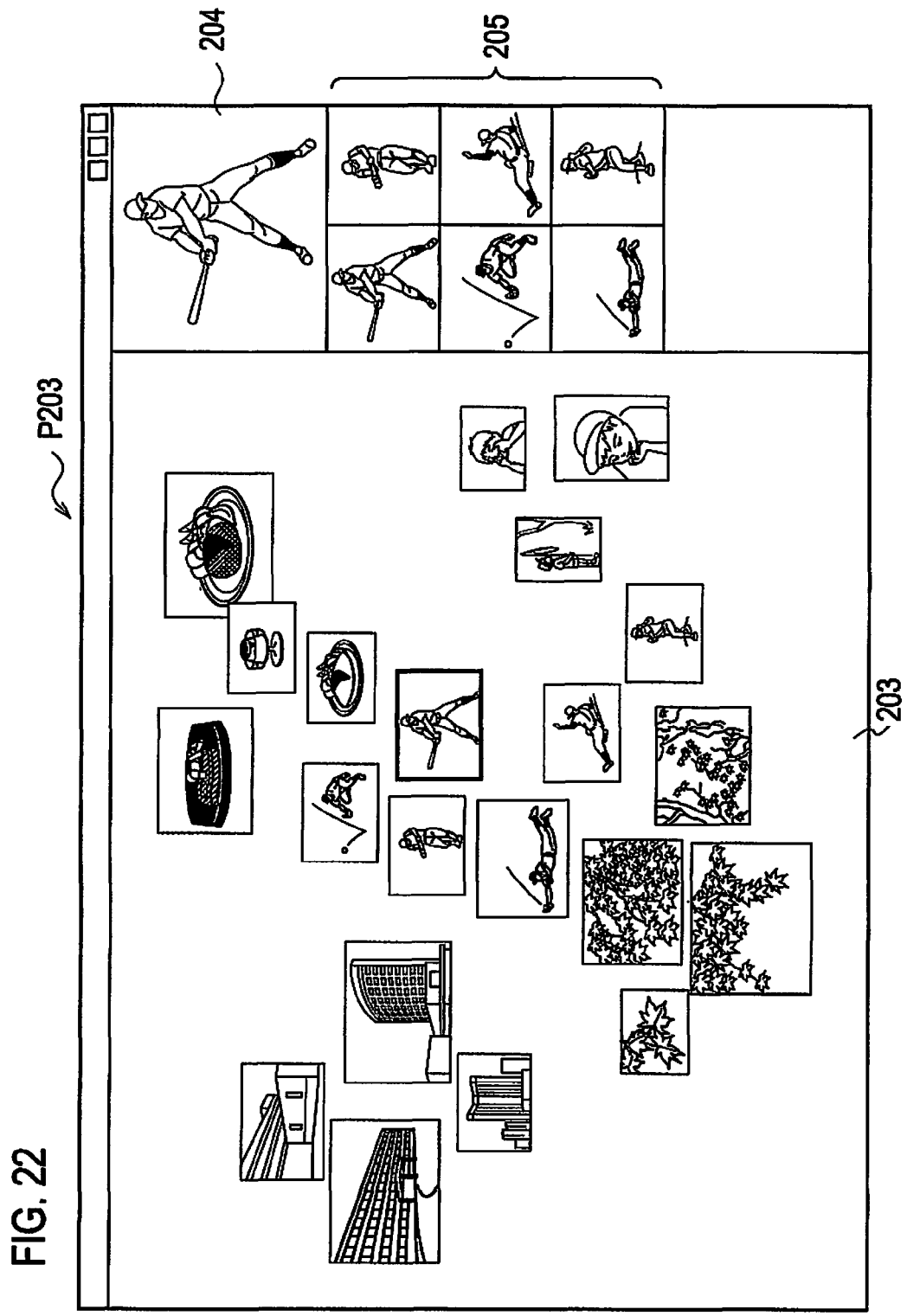
FIG. 22 shows an example of a result screen displayed by a display unit of the image classification device according to the modified embodiment of the present invention.

The display unit 20 of the image classification device 1 according to the preferred embodiment of the present invention displays the process of the images gathering into clusters of similar images by animation. On the other hand, in the display unit 20a of the image classification device 1a according to the modified embodiment of the present invention, visualization is performed by focusing on the query image data 52 since the query image data 52 is inputted. Specifically, the display unit 20a updates camera parameters so that a query image is always displayed in the center of the screen in perspective transformation as shown in FIG. 22. Thus, the display unit 20a visualizes, on the screen, a process in which the images similar to the query image data 52 are gathered.

The display unit 20a displays a result screen P203 shown in FIG. 22, for example. This result screen P203 is obtained by extracting image data similar to the query image data 52 in the image classification device 1a according to the modified embodiment of the present invention. In a query image display part 204, a thumbnail of the query image data 52 is displayed. In the center of a classification result display part 203, the thumbnail of the query image data 52 is displayed. Moreover, in the classification result display part 203, thumbnails of images similar to the query image data 52 are displayed nearby and thumbnails of images not similar thereto are displayed farther away. In a similar image display part 205, sets of the image data belonging to the same cluster as that of the query image data 52, among the sets of the image data displayed in the classification result display part 203, are displayed as similar images. In this event, only sets of the image data having similar feature vectors may be displayed among the sets of the image data belonging to the same cluster.

Thus, images similar to the query image data can be searched for. The image classification device 1a according to the modified embodiment of the present invention allows the user to intuitively search for desired images by arranging similar images around the query image data 52 on the three-dimensional space.

(Effects)

The image classification device 1a according to the modified embodiment of the present invention allows the user to efficiently view the search result by visually displaying the search result on the three-dimensional space. Specifically, the image classification device 1a allows the user to intuitively understand the search result by using a distance on the three-dimensional space as a dissimilarity between images. Furthermore, by setting the distance on the three-dimensional space based on the dissimilarity between images, images similar to an image other than the query image displayed as a search result are also displayed nearby. Thus, the image classification device 1a allows the user to efficiently view the search result.

Moreover, the image classification device 1a according to the modified embodiment of the present invention enables efficient search with a small computational complexity by using a clustering result of the images in the search target database upon searching. Specifically, upon searching, first, feature value calculation and clustering are assumed to be completed for the search target images in the image database 51 by use of the method described in the preferred embodiment. Thereafter, when the query image data 52 is inputted, the image classification device 1a performs clustering of the query image by use of the clustering result in the image database 51, thereby enabling efficient processing.

Other Embodiments

Although the present invention has been described as above with reference to the preferred embodiments and modified examples of the present invention, it should be understood that the present invention is not limited to the description and drawings which constitute a part of this disclosure. From this disclosure, various alternative embodiments, examples and operational techniques will become apparent to those skilled in the art.

For example, the image classification device described in the preferred embodiment of the present invention may be configured on one set of hardware as shown in FIG. 1 or may be configured on multiple sets of hardware according to functions and the number of processes. Alternatively, the image classification device may be implemented in an existing information system.

As a matter of course, the present invention includes various embodiments and the like which are not described herein. Therefore, the technical scope of the present invention is defined only by matters to specify the invention according to the scope of claims pertinent based on the foregoing description.

The invention claimed is:

1. An image classification device for classifying sets of image data into groups of similar images, comprising:
   an image database on a non-transitory computer-readable storage medium for storage of the sets of image data;
   a characteristic value set calculation unit configured to calculate a characteristic value set of the whole image of the set of image data, detect an edge of the corresponding set of image data, and calculate a characteristic value set of the detected edge portion, for each of the sets of image data;
   a first clustering unit that configured to classify the sets of image data into clusters based on the characteristic value sets of the whole images;
   a second clustering unit configured to further classify the clusters classified by the first clustering unit into clusters based on the characteristic value sets of the edge portions;
   a cluster integration unit configured to determine which pixels constitutes a subject in each of the sets of image data, based on a composition of the corresponding image, and integrate some of the clusters classified by the second clustering unit together based on the pixels constituting the subject; and
   a display unit configured to arbitrarily arrange thumbnails of the sets of image data, update and display coordinates of each of the thumbnails based on the characteristic value set of the whole image of the image data, the characteristic value set of the edge portion of the image data, the characteristic value set of the pixels constituting the subject of the image data, and the clusters of the image data determined by the cluster integration unit, calculate a shift amount of each of the thumbnails, and repeat the processing of updating and displaying the coordinates until the shift amount of each of the thumbnails is converged to 0.

2. An image classification program being on a non-transitory computer-readable storage medium for classifying sets of image data into groups of similar images allowing a computer to function as:
   characteristic value set calculation means for calculating a characteristic value set of the whole image of set of image data stored in an image database, detecting an edge of the corresponding set of the image data, and calculating a characteristic value set of the detected edge portion, for each of the sets of image data;
   first clustering means for classifying the sets of image data into clusters based on the characteristic value sets of the whole images;
   second clustering means for further classifying the clusters classified by the first clustering means into clusters based on the characteristic value sets of the edge portions;
   cluster integration means for determining which pixels constitutes a subject in each of the sets of image data, based on a composition of the image, and integrates some of the clusters classified by the second clustering means together based on the pixels constituting the subject; and
   display means for arbitrarily arranging thumbnails of the sets of image data, updating and displaying coordinates of each of the thumbnails based on the characteristic value set of the whole image of the image data, the characteristic value set of the edge portion of the image data, the characteristic value set of the pixels constituting the subject of the image data, calculating a shift amount of each of the thumbnails, and repeating the processing of updating and displaying the coordinates until the shift amount of each of the thumbnails is converged to 0.

* * * * *